(12) United States Patent
Brossard

(10) Patent No.: US 7,232,000 B2
(45) Date of Patent: Jun. 19, 2007

(54) DRIVE-STEER AXLE FOR MOTOR-DRIVEN VEHICLES

(75) Inventor: Jean-Claude Brossard, Meulan (FR)

(73) Assignee: GKN Driveline International GmbH (DE)

( * ) Notice: Subject to any disclaimer, the term of this patent is extended or adjusted under 35 U.S.C. 154(b) by 347 days.

(21) Appl. No.: 10/491,805

(22) PCT Filed: Sep. 27, 2002

(86) PCT No.: PCT/FR02/03322

§ 371 (c)(1), (2), (4) Date: Jul. 1, 2004

(87) PCT Pub. No.: WO03/041986

PCT Pub. Date: May 22, 2003

(65) Prior Publication Data

US 2004/0235606 A1 Nov. 25, 2004

(30) Foreign Application Priority Data

Oct. 5, 2001 (FR) .................................. 01 12871

(51) Int. Cl.
*B60K 17/30* (2006.01)
(52) U.S. Cl. .................. 180/256; 464/111; 475/222
(58) Field of Classification Search ........ 280/253–257, 280/260–262; 464/110–115; 475/222
See application file for complete search history.

(56) References Cited

U.S. PATENT DOCUMENTS

| | | | |
|---|---|---|---|
| 1,847,749 A | | 3/1932 | Bussien |
| 1,937,821 A | * | 12/1933 | Jarrett ......................... 180/256 |
| 1,981,173 A | | 11/1934 | Herrington |
| 2,015,688 A | * | 10/1935 | Ney ............................ 464/140 |
| 2,084,429 A | | 6/1937 | Bussien |
| 4,068,499 A | * | 1/1978 | Sharp ......................... 464/115 |
| 4,273,209 A | * | 6/1981 | Orain ......................... 180/254 |
| 4,300,651 A | * | 11/1981 | Krude ........................ 180/256 |
| 4,365,686 A | * | 12/1982 | Orain ......................... 180/256 |
| 4,610,327 A | * | 9/1986 | Orain ......................... 180/380 |
| 5,951,401 A | * | 9/1999 | Kita et al. .................. 464/113 |

FOREIGN PATENT DOCUMENTS

| | | |
|---|---|---|
| DE | 489332 | 1/1930 |
| DE | 597232 | 5/1934 |
| FR | 712018 | 9/1931 |

* cited by examiner

Primary Examiner—Kevin Hurley

(57) ABSTRACT

The invention concerns an axle (1) comprising a differential (6), two transmission lines (8) from the differential and adapted each to drive a drive wheel (2), members (4) for directional control of the drive wheels (2), each transmission line (8) including an input shaft (10) connected to the differential (6), an output shaft (12) connected to the corresponding drive wheel (2), a pivot (20) with axis oriented transversely to each of the input (10) and output (12) shafts, and a double torque transmitting joint (30) between the input shaft (10) and the output shaft (12). Said double-joint comprises two elementary joints (30A, 30B) axially connected to each other along a double-joint axis and including each an elementary break center. Each shaft (10, 12) defines a fixed position, along its axis (X-X, Y-Y), of the elementary break center of the corresponding joint (30A, 30B). Additionally, one at least of the two elementary joints (30A, 30B) is a joint freely sliding along the double-joint axis.

25 Claims, 21 Drawing Sheets

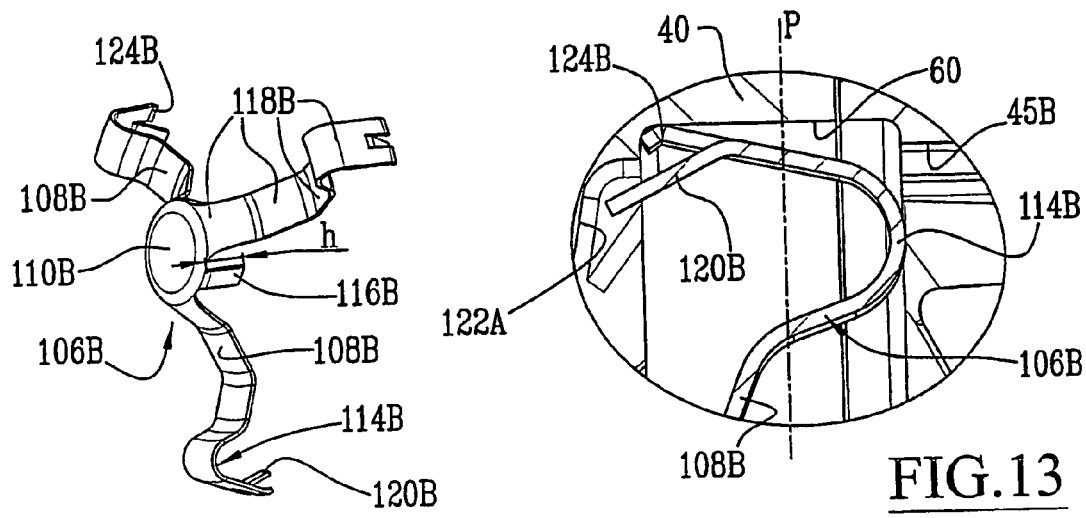
FIG.10
FIG.13
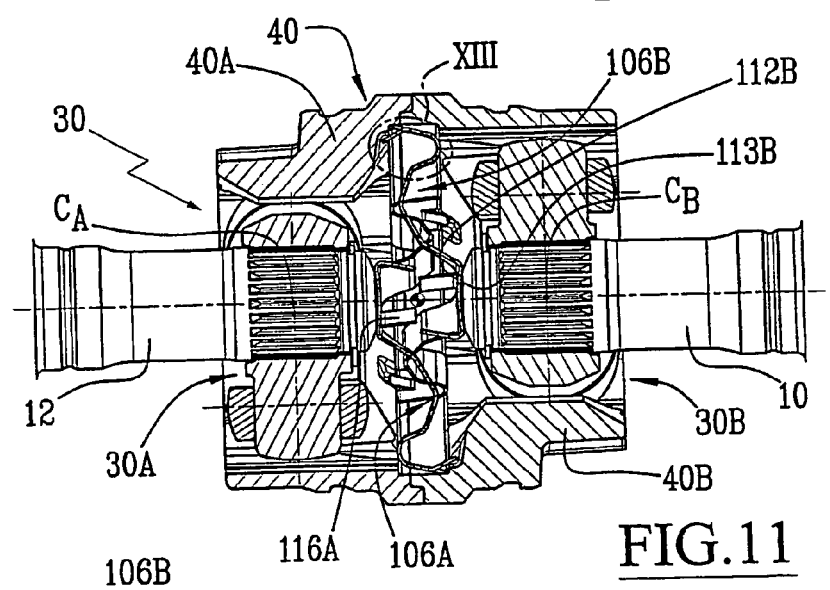
FIG.11
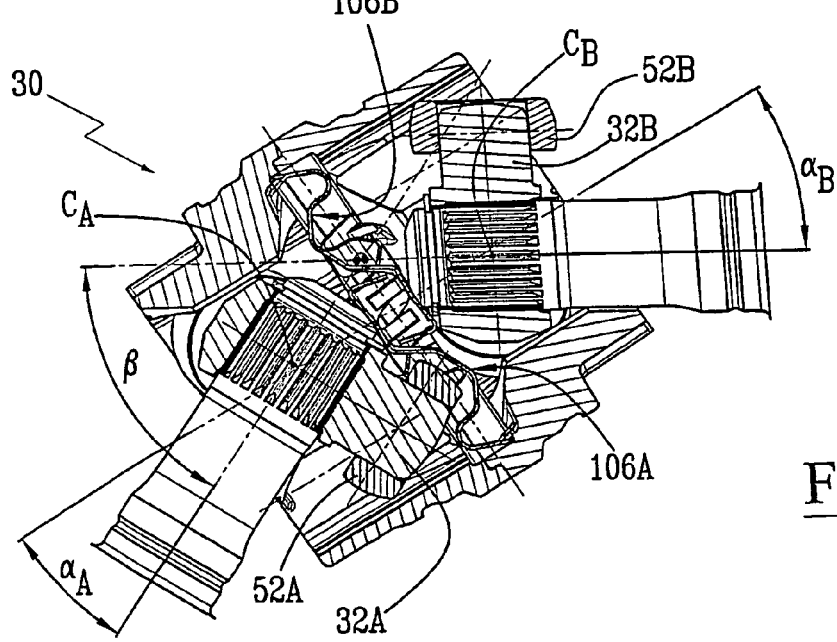
FIG.12

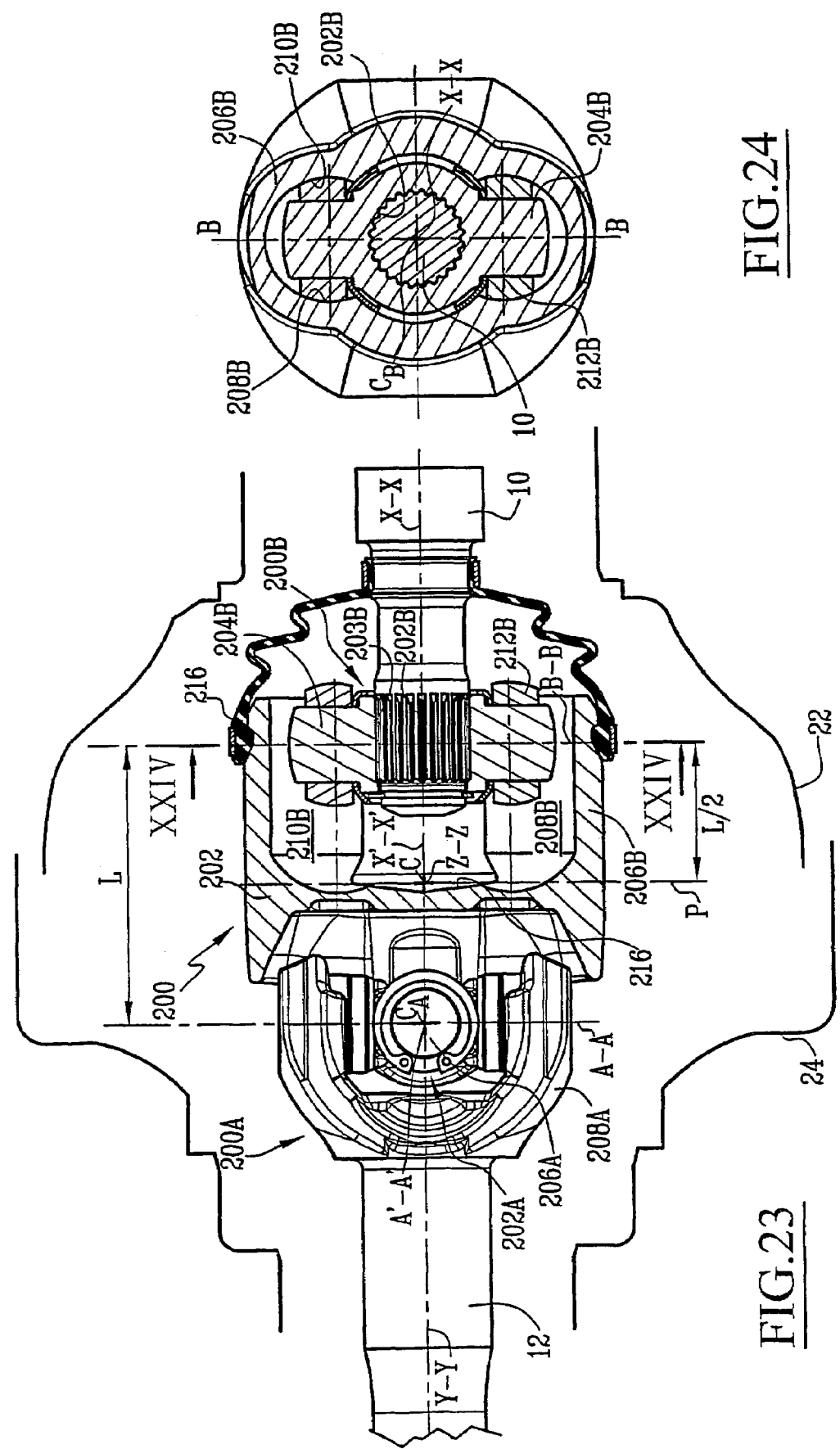

DRIVE-STEER AXLE FOR MOTOR-DRIVEN VEHICLES

BACKGROUND

The present invention relates to a driving/steering axle for motor vehicles. In particular, the invention concerns a driving/steering axle having a differential, two transmission lines which originate from the differential and which are each adapted for driving a drive and steering wheel, each transmission line including an input shaft which is connected to the differential, an output shaft which is connected to the corresponding drive wheel, a wheel pivot having an axis which is orientated transversely to each of the input shaft and the output shaft, and a double joint for torque transmission between the input shaft and the output shaft. The input and output shafts are guided directionally in space independently of the double joint. The double joint is arranged substantially perpendicularly to the pivot and includes two elementary joints which are connected axially to each other along a double joint axis and which each have an elementary breaking center.

This type of axle is used in the field of motor vehicles of the all wheel drive type, such as industrial vehicles, farm tractors or "4×4" touring vehicles. This type of vehicle comprises at least one such driving/steering axle, commonly known as a "rigid axle", which is provided with a differential and which can simultaneously transmit, from the differential casing, a drive torque to each wheel, with which each of the ends thereof is provided, and to allow the steering lock of these wheels when the vehicle has to change direction. In more precise terms, such a driving/steering type axle comprises:

- an axle member which acts as a beam and which is constituted by a central casing which is provided with a differential assembly and the support bearings thereof and which is extended by two lateral flared tubes, one per side of the vehicle, each of them terminating in a directionally pivoting jaw; an input shaft is arranged in each flared tube and is supported, at the jaw side, by a bearing and, at the differential side, by a corresponding planetary gear of the differential assembly, to which it is fixedly joined in terms of rotation by ribs;
- a wheel hub, at each side of the vehicle, which supports the wheel by means of bearings, the wheel receiving the rotation movement thereof from a spindle which extends through it and which forms an output shaft; the wheel hub is itself also provided with a pivoting jaw, which is associated with that of the flared tube of the axle member, along a substantially vertical pivot axis arrangement, commonly known as the "wheel pivot"; and
- an articulation which ensures the transmission of the torque from the input shaft which is positioned in the flared tube of the axle member to the wheel spindle, whether the wheel is straight or pivoted, and which is positioned perpendicularly to the axis arrangement of the wheel pivot.

Until now, various articulations have been used to ensure the transmission of torque at the wheel pivot. At first, for example, double-joint articulations having a cardan type kinematic arrangement were preferred, the spacing between the articulation centers of the elementary joints of the double joint being constant, such as the Richard Bussien articulations described, for example, in U.S. Pat. Nos. 1,847,749 and 2,084,429.

Subsequently, the use of articulations having double joints constituted by two fixed cardan type elementary joints became widespread.

In all cases, these articulations bring about a translation movement of one of the shafts during the steering lock of the wheels and therefore during the breaking of the double joint. This movement is absorbed either by the driving ribs of the planetary gear of the differential (input shaft) or by those of a wheel reduction gear (output shaft), which produces additional mechanical stresses which are detrimental to the correct operation and the reliability of the articulation, both in the region of the double joint and the sealing members and the support means for the shafts, such as the bearings thereof.

Furthermore, the articulations having two fixed cardan type joints, in a so-called "W" configuration, have the disadvantage of a high loss in torque transmission when the breaking angle formed between the axes of the input shaft and output shaft deviates from an angle of zero.

The object of the invention is to provide a driving/steering axle of the type set out above whose mechanical characteristics, in particular in terms of friction, noise and vibrations, are improved.

SUMMARY OF THE INVENTION

To this end, the invention relates to a driving/steering axle of the above-mentioned type wherein each shaft defines a fixed position along the axis thereof of the elementary breaking center of the corresponding elementary joint, and at least one of the two elementary joints is a joint which slides freely along the double joint axis.

To this end, the invention relates to a driving/steering axle of the above-mentioned type which has the features of the characterising portion of claim 1.

The axle can include mechanisms for axially retaining the input shaft and output shaft along the respective axes thereof. Further, the input shaft can be fixedly joined to a planetary gear of the differential, ensuring the axial retention of the input shaft along the axis thereof, and the output shaft can be fixedly joined to a wheel spindle of the corresponding drive wheel, ensuring the axial retention of the output shaft along the axis thereof. The first elementary joint can be a freely sliding joint, and the second elementary joint can be a structurally non-sliding joint.

In one embodiment, the two elementary joints are axially connected by a double-joint member.

In another aspect, the double joint includes an axial maintenance mechanism for the double-joint member in order to adjust the sliding actions of each freely sliding elementary joint. The axial maintenance mechanism can be connected to the double-joint member and in direct or indirect contact with the input shaft and output shaft. The axial maintenance mechanism can include at least one axially resilient stop member which is retained relative to the double-joint member and which has a zone of direct or indirect contact for the ends of the shafts which are connected by the double joint. The zone of direct contact and the corresponding shaft end can have substantially complementary forms.

In a further aspect of the invention, the double joint can include at least one insert which is positioned between the axial maintenance mechanism and at least one of the input shaft and the output shaft. Each insert can have a convex surface for contact with an associated surface of the axial maintenance mechanism which is substantially complementary to the convex surface. Alternatively, each insert can have a concave surface or planar surface for contact with an end surface of the corresponding shaft having a form which is substantially complementary to the concave or planar surface. Further, each insert can be fixedly joined to the axial maintenance mechanism by clipping the insert to the axial maintenance mechanism. In a further embodiment, each insert is fixedly joined to the corresponding shaft by a portion of the insert being fitted and secured inside a blind hole which is formed at the end of the shaft. The inserts can be made of plastics containing, in particular, polyamide, molybdenum and glass fibers.

In another embodiment, only the first elementary joint is a freely sliding joint, and the second elementary joint is a structurally sliding joint which is provided with means for the axial retention of the sliding portion of the second joint.

In yet another embodiment, the two elementary joints are freely sliding, and the axial maintenance mechanism comprises, for each elementary joint, an axially resilient stop member which is formed by a star-shaped spring which is provided with a curvature which forms a direct or indirect contact for the ends of the shafts, which ends are connected by the double joint, and a plurality of arms which extend radially relative to the double-joint axis from the curvature. The free ends of the arms are received in a channel which is formed in the internal periphery of the double-joint member. At least one arm of each star-shaped spring can be provided with a means for angularly indexing the star-shaped spring relative to the double-joint member. Further, the axial maintenance mechanism can comprise an axial stop member arranged between the curvatures of the two star-shaped springs. The stop member provides a minimum spacing between these curvatures at least during the assembly of the axle. In addition, a compression spring can be interposed between the curvatures of the two star-shaped springs. The compression spring can optionally be used in conjunction with the star-shaped springs. The compression spring aids in fixing the axial position of each of the input shaft and the output shaft along the axes thereof.

In another embodiment of the axle, the two elementary joints are substantially homokinetic. For example, the two elementary joints can be tripod-type joints, ball-type joints or axial engagement joints. In another aspect of the axle, the two elementary joints have a substantially similar cardan-type kinematic arrangement.

Another embodiment of the present axle provides that the input shaft and output shaft are substantially co-planar and define an articulation center at the point of intersection of the axes thereof when the axes form a breaking angle (β) of the double joint. For any permissible value of the breaking angle (β) of the double joint, the elementary breaking angles ($\alpha_A$, $\alpha_B$) of each elementary joint can be substantially equal.

In still another embodiment of the axle, each elementary joint is a tripod-type joint having a joint member comprising three pairs of sliding tracks. The three pairs of tracks of one elementary joint are displaced through approximately 60° relative to the three pairs of tracks of the other elementary joint. Alternatively, the three pairs of tracks of one elementary joint can be arranged substantially as a continuation of the three pairs of tracks of the other elementary joint.

The invention will be better understood from a reading of the description below which is given purely by way of example, with reference to the drawings, in which:

BRIEF DESCRIPTION OF THE DRAWINGS

FIG. 10 is a view similar to FIG. 4, showing a variant of the component of FIG. 4;

FIGS. 11 and 12 are views similar to FIGS. 2 and 8 of a double joint provided with two components from FIG. 10;

FIG. 13 is a view at a larger scale of the circled detail XIII in FIG. 11;

FIG. 23 is a view substantially similar to FIG. 2, showing a second embodiment of the axle;

FIG. 24 is a view sectioned along plane XXIV—XXIV indicated in FIG. 23;

DETAILED DESCRIPTION

Figure 1:
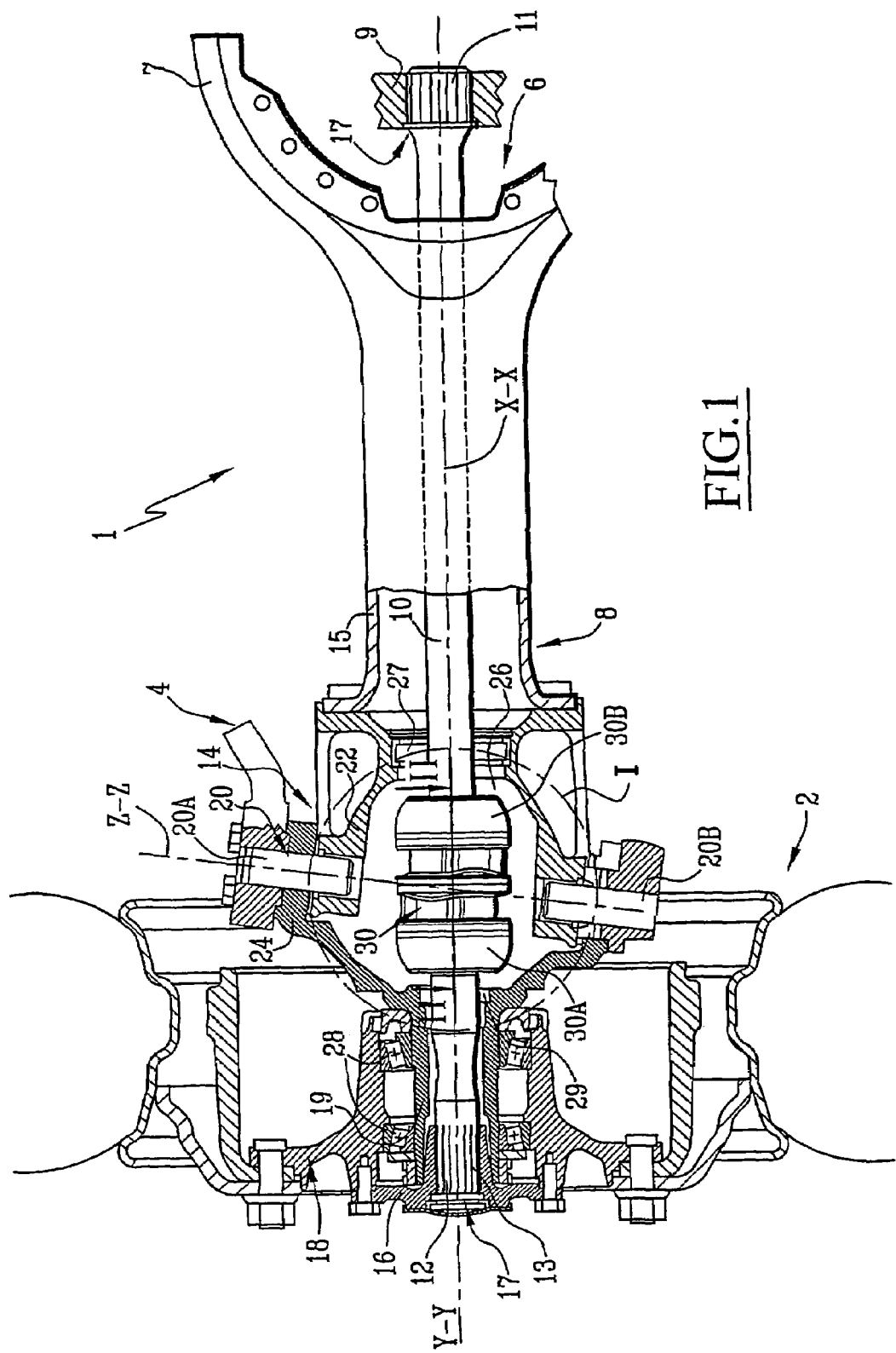
FIG. 1 is a partial longitudinal section of a driving/steering axle according to one embodiment of the invention.

FIG. 1 shows a driving/steering axle or rigid axle 1, only approximately half of which is visible in FIG. 1. This axle is intended to be fitted to a motor vehicle of the "all wheel drive" type, such as industrial vehicles or farm tractors.

This driving/steering type axle 1 is provided at each end with a drive wheel 2 and is suitable for simultaneously allowing the chassis of the vehicle to rest on the wheels thereof, to support directional control members 4 of these drive wheels, whilst keeping the spacing between them constant, and to transmit a drive torque to each of these wheels 2.

The axle 1 comprises, in the common portion thereof, a differential assembly 6 which is arranged in an axle casing 7 and which is suitable for allowing the drive wheels 2 to rotate at different speeds on bends, as is known in the art. This differential assembly 6 will not per se be described in greater detail below.

The axle 1 comprises two transmission lines 8 which extend from the differential 6 as far as a drive wheel 2, respectively. Only one of these transmission lines can be seen in FIG. 1 and will be described in greater detail below, it being understood that the second transmission line which is not illustrated is provided with similar arrangements.

This transmission line 8 comprises an input shaft 10 which has an axis X-X and which is connected to the differential 6, an output shaft 12 which has an axis Y-Y and which is connected to the wheel 2 and an articulated assembly 14 for torque transmission. In FIG. 1, axes X-X and Y-Y are aligned, which is not necessarily always the case, axes X-X and Y-Y being able to be non-co-planar.

In more precise terms, the inner end 11 of the shaft 10 is fixedly joined to a planetary gear 9 of the differential assembly 6, ensuring both the driving in rotation of the shaft and the axial retention of this shaft. To this end, the end 11 is ribbed in a manner complementary to a broached hole of the planetary gear 9. The shaft 10 further extends inside a fixed protective flared tube 15 which is integral with the axle casing 7.

The shaft 12 is fixedly joined to the wheel 2 by means of a sleeve 16 which is fixedly joined, on the one hand, to the outer end 13 of the shaft 12 and, on the other hand, a wheel spindle 18 of the wheel 2. The outer end 13 of the shaft 12 is ribbed for this purpose in a manner complementary to a broached hole of the sleeve 16. The shaft 12 extends inside a hub 19.

The ends 11 and 13 of the shafts 10 and 12 are retained axially relative to the planetary gear 9 and the sleeve 16, respectively, by fixing members, such as screws, nuts and/or circlips, which are not shown in detail and which are generally designated 17.

The assembly 14 is intended to transmit a drive torque from the input shaft 10 to the output shaft 12, whilst allowing the steering lock of the wheel 2. To this end, the assembly 14 is connected to the directional control members 4 of the wheel 2 and comprises a pivot 20 having an axis Z-Z, as well as two C-shaped jaws 22 and 24 facing each other. These jaws are articulated about the pivot 20 by the ends of the Cs and together delimit an articulation cavity 26.

The pivot 20 is constituted by two bearing journals in the form of substantially coaxial rods 20A and 20B having an axis Z-Z which is slightly inclined relative to the vertical, each rod extending inside corresponding holes which are provided in each jaw 22, 24 at one side and the other of the cavity 26.

The jaw 22 is further connected to the shaft 10 by means of a bearing 27 for supporting this shaft and is fixedly joined to the flared tube 15 of the shaft 10. The jaw 24 supports the shaft 12 by means of a bearing 29 and is fixedly joined, at one side, to the directional control member 4 of the wheel and, at the other side, to the wheel hub 19, which supports the wheel spindle 18 by means of bearings 28. These bearings 28 are suitable for transmitting to the wheel 2 the pivot movement about axis Z-Z of the jaw 24 relative to the jaw 22, which movement is controlled by the member 4 and thereby allows the steering lock of the wheel 2.

The assembly 14 also comprises a double joint 30 for torque transmission which connects the input shaft 10 to the output shaft 12 and which is arranged inside the cavity 26. This member 30 is illustrated in detail in FIGS. 2 to 8, the jaws 22 and 24 being merely indicated in these Figures.

Figure 8:
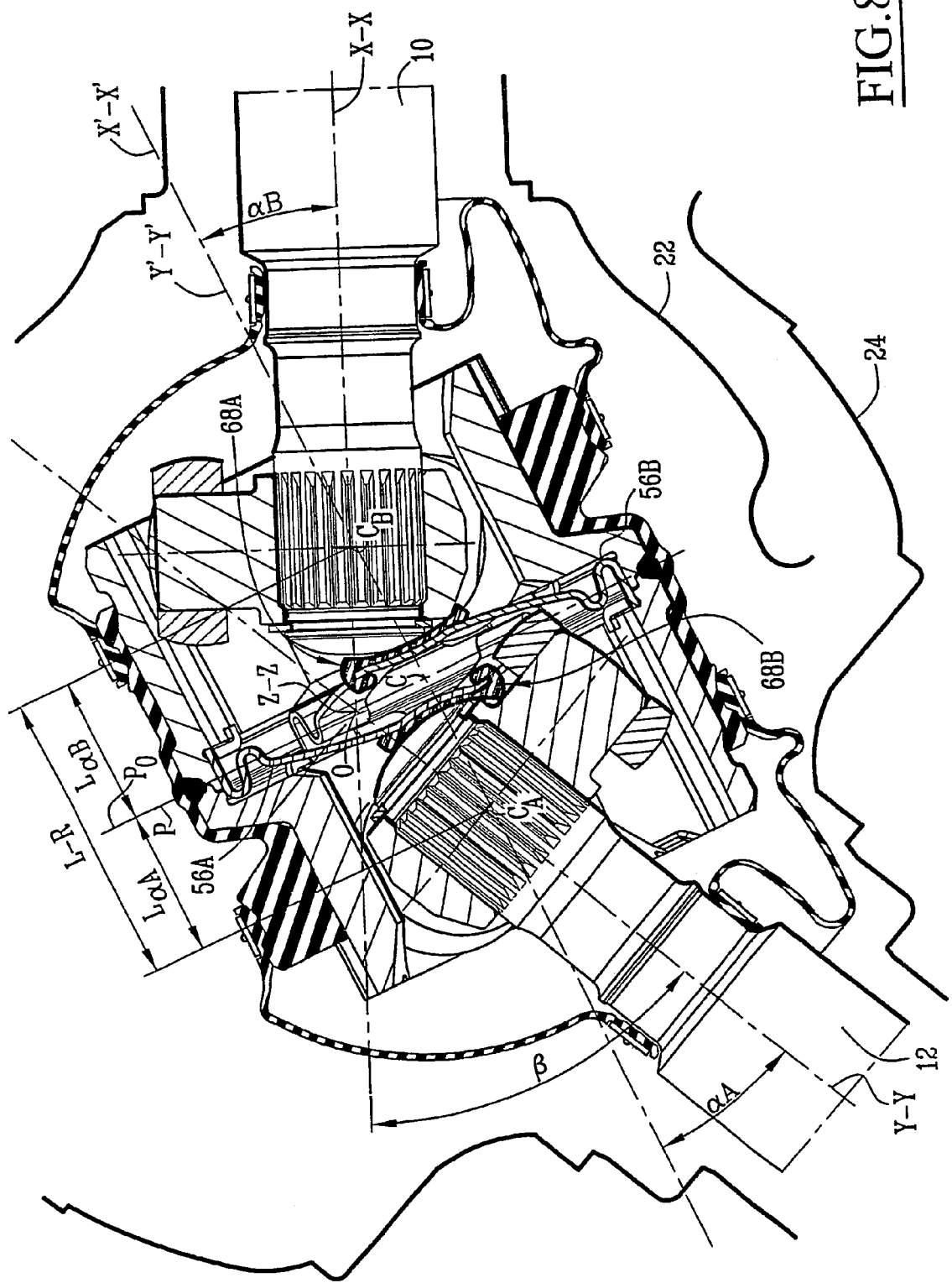
FIG. 8 is a view similar to FIG. 2, showing the axle in a different operational state from that in FIG. 2.

The double joint 30 comprises two elementary joints 30A and 30B, that is to say, two homokinetic tripod type and sliding joints in the embodiment of FIGS. 2 to 5. This double joint 30 defines an articulation centre O at the intersection of the axes of the input shaft 10 and output shaft 12 when these shafts form a breaking angle $\beta$ (FIG. 8). The double joint 30 is further positioned, when the articulation 14 is assembled, inside the cavity 26 so that pivot axis Z-Z extends substantially through articulation centre O.

The components of the joint 30A will be described in greater detail below, the components of the joint 30B being similar and being indicated by the same reference numeral followed by the letter B.

The joint 30A substantially comprises the following components:

1) A male or tripod element 32A which has ternary symmetry about central axis Y-Y (axis X-X for joint 30B) and which comprises a ribbed hole 34A and three radial arms 36A which have an axis A-A and which are angularly spaced at 120°, only one of which is illustrated. The intersection of axes Y-Y and A-A defines the breaking centre $C_A$ of the joint 30A. The ribbed hole 34A is suitable for being fitted so as to be secured to the corresponding ribbed end of the shaft 10, the shaft 10 being stopped axially by a stop ring 38A.

Figure 2:
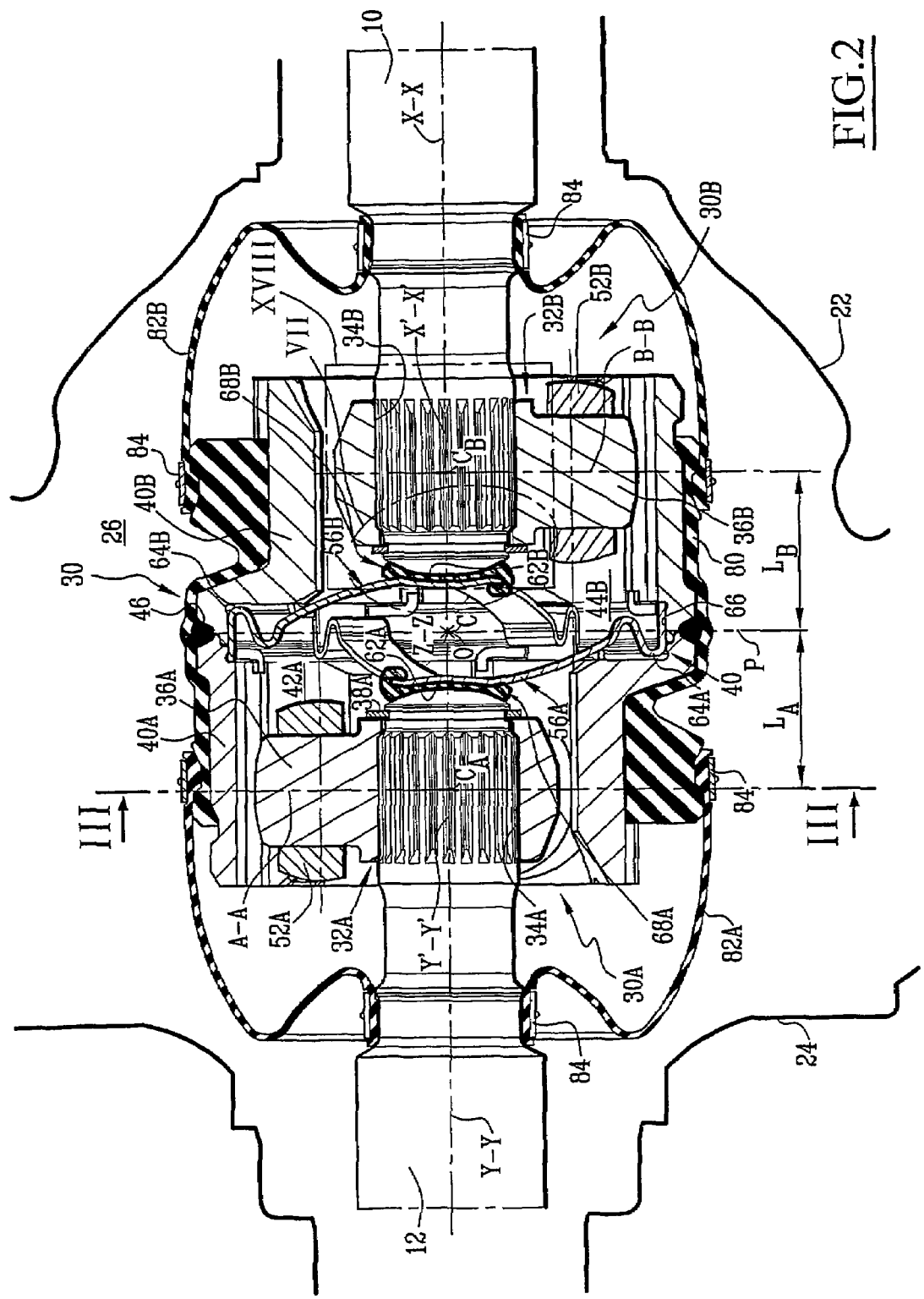
FIG. 2 is a view sectioned along plane II—II which is indicated in circled detail I of FIG. 1, illustrating a double joint of the axle of FIG. 1.
Figure 3:
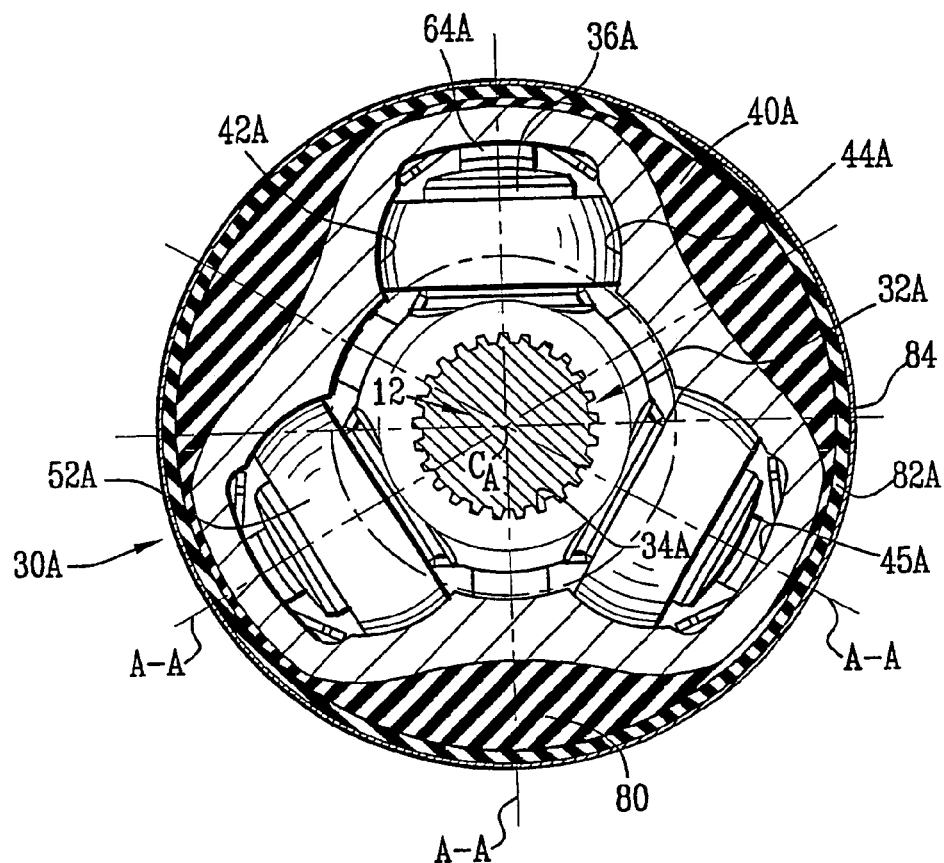
FIG. 3 is a view sectioned along the plane indicated III—III in FIG. 2.

2) A female or tulip element 40A which has ternary symmetry about central axis Y'-Y' (or axis X'-X' for joint 30B), this axis being aligned with axis Y-Y in the aligned position of the joint illustrated in FIG. 2. At one side and the other of each arm 36A, this tulip has two cylindrical tracks 42A and 44A, respectively, facing each other and forming an arch 45A. The two female elements 40A and 40B are fixedly joined to each other along plane P which is substantially perpendicular to axes X'-X' and Y'-Y', for example, by means of a weld bead 46, so that, on the one hand, they are substantially coaxial, that is to say that axes Y'-Y' and X'-X' are substantially aligned, and, on the other hand, the displacement between a pair of tracks 42A, 44A of the joint 30A and the following pair of tracks 42B, 44B of the joint 30B is substantially equal to 60°. The elements 40A and 40B thus form a double-joint member 40, or "double tulip" member, having a double-joint axis X'-X' for the double joint 30 having a centre C which is defined by the intersection of axis X'-X' with plane P.

3) For each arm 36A, mechanical transmission means 50A which comprise an externally spherical roller 52A which has an axis of revolution substantially in alignment with axis A-A of the arm 36A corresponding to the position illustrated in FIG. 2.

The roller 52A is intended to roll on one or other of the corresponding tracks 42A and 44A and slides on the arm 36A thereof.

Figure 4:
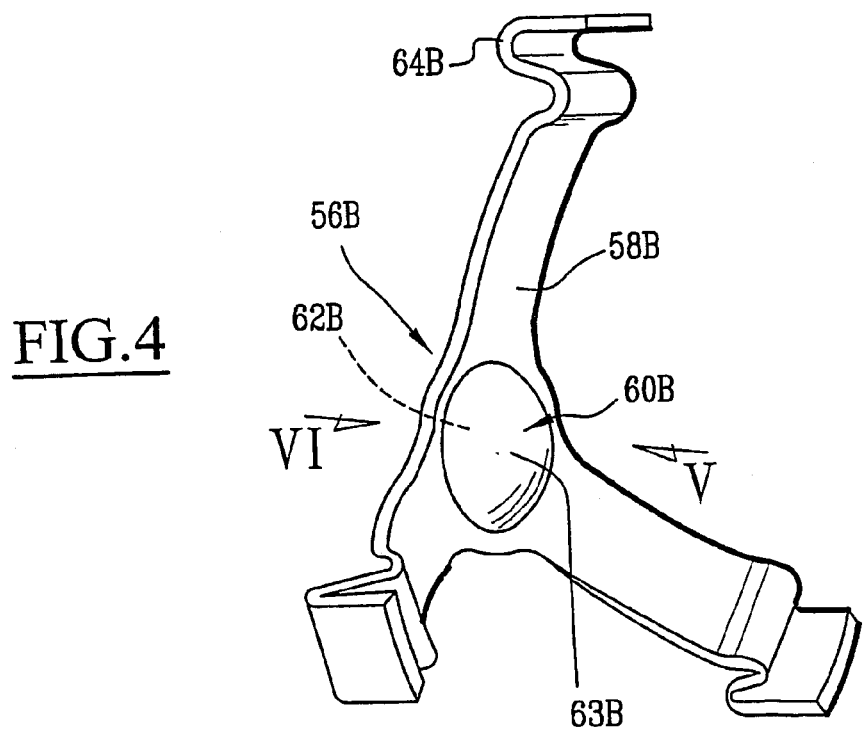
FIG. 4 is a perspective view of a component of the double joint of the axle according to an embodiment of the invention.

The double-joint member 40 comprises, for each sliding joint 30A and 30B, a spring 56A and 56B which has ternary symmetry and which is generally star-shaped having three arms 58A, 58B, respectively, as illustrated in greater detail in FIG. 4. The central portion of the star 56A, 56B delimits a curvature 60A, 60B having concavity directed towards the joint 30B or 30A, forming a convex surface 62A which is directed towards the input shaft 10 or a convex surface 62B which is directed towards the output shaft 12, which are substantially spherical, and an opposing concave surface 63A or an opposing concave surface 63B, respectively. The free end of each arm 58A, 58B comprises a resilient stop 64A, 64B for axial retention along axis X'-X' of the spring 56A, 56B, this stop being in the form of folds of the free end of the arm. The stops 64A and 64B of the springs 56A and 56B are received in a channel 66 which is formed in the inner periphery of the double tulip 40, respectively.

These springs 56A and 56B are suitable for maintaining, along double-tulip axis X'-X', the elementary joints 30A and 30B, absorbing the shortening actions thereof. In other words, these springs 56A and 56B are able to maintain, relative to a plane $P_o$ containing the articulation center O and parallel with the junction plane P of the two tulips 40A and 40B, the planes P and $P_o$ being in alignment in FIGS. 2 and 8, on the one hand, center $C_A$ of the joint 30A at a given distance $L\alpha_A$ which is a function of breaking angle $\alpha_A$ of the joint 30A which is formed by axis X-X and axis X'-X' (FIG. 8) and, on the other hand, center $C_B$ of the joint 30B at a given distance $L\alpha_B$ which is a function of breaking angle $\alpha_B$ of the joint 30B which is formed by axis Y-Y and axis X'-X'.

Each spring 56A, 56B is optionally provided with an insert 68A, 68B of plastics material. Each insert is of general trough-like form having substantially the same concavity as the central curvature 60A, 60B of the corresponding spring 56A, 56B and is intended to be positioned between the spring and the associated end of the input shaft 10 or output shaft 12.

Figure 5:
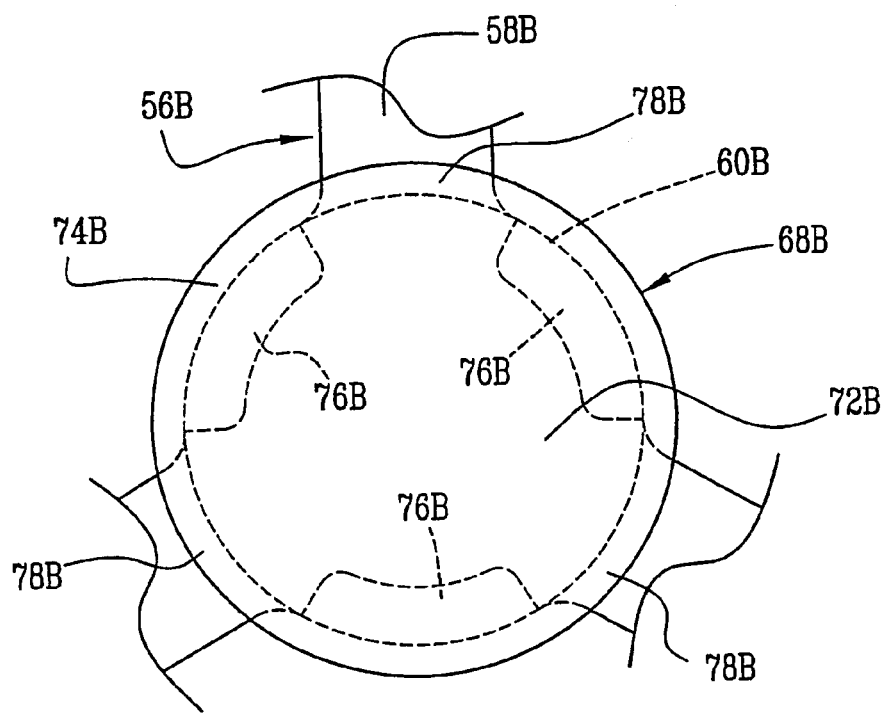
FIGS. 5 and 6 are views according to arrows V and VI indicated in FIG. 4, respectively, of the component of FIG. 4 provided with an insert of plastics material.
Figure 6:
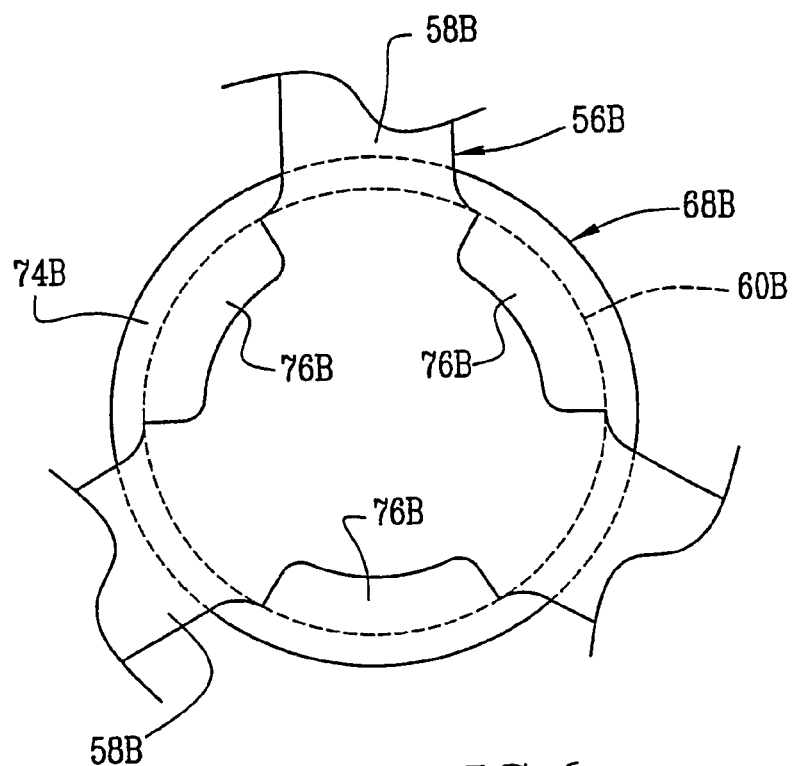
Figure 7:
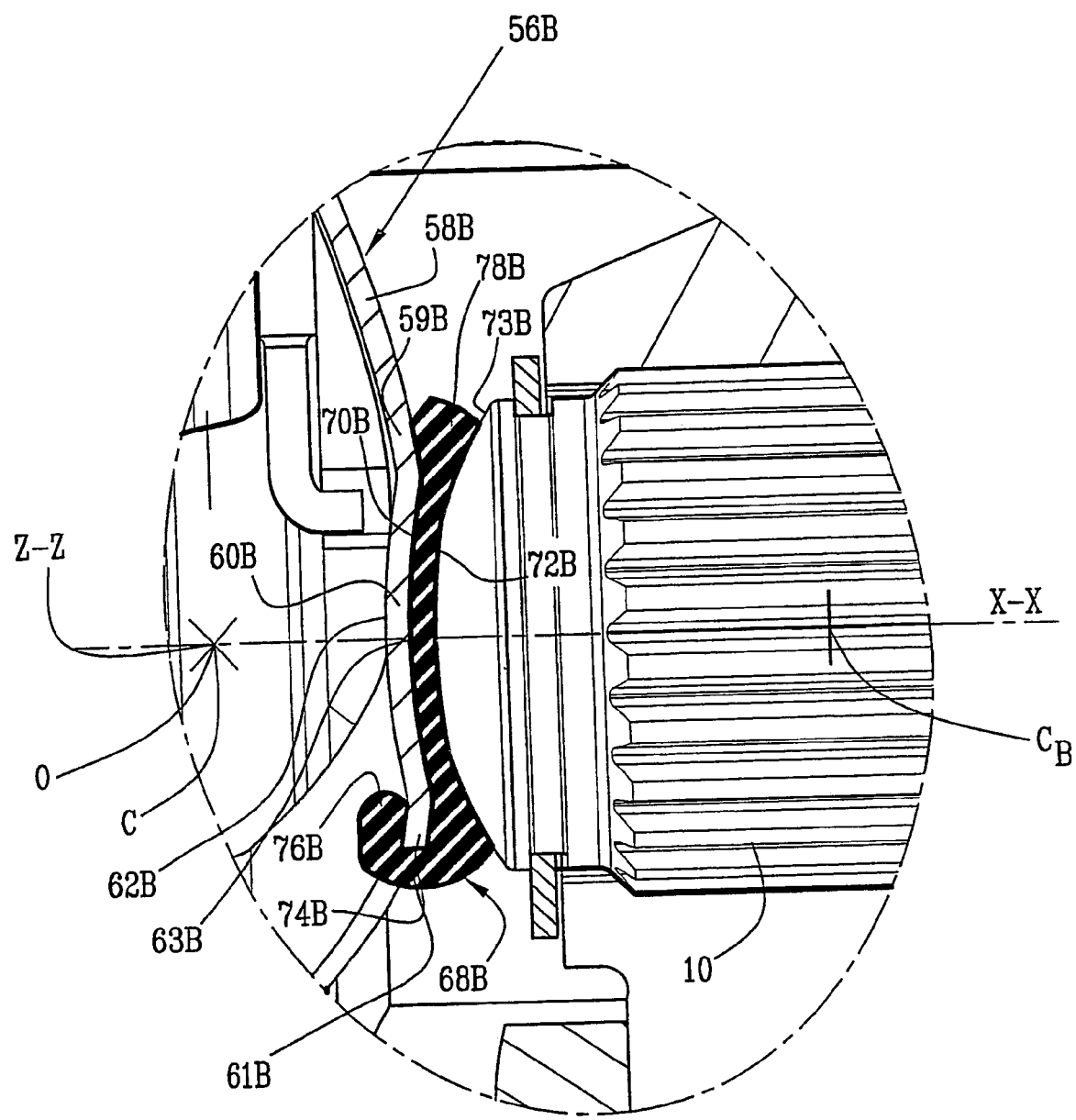
FIG. 7 is a view at a larger scale of the circled detail VII in FIG. 2.

The insert 68B will be described in detail below with reference to FIGS. 5 to 7, it being understood that the insert 68A has similar arrangements which are indicated by the same reference numeral followed by the letter A.

At the side directed towards the elementary joint 30A, the insert 68B has a convex curved surface 70B for contact with the concave surface 63B of the star-shaped spring 56B. At the opposite side, the insert has a surface 72B for contact with the end of the shaft 10. These contact surfaces 70B and 72B have substantially complementary forms relative to the surface 63B which is formed by the curvature 60B and the end surface 73B of the shaft 10.

The insert 68B is provided with a peripheral shoulder 74B which is suitable for fixing the insert to the spring 56B. For this purpose, the shoulder 74B comprises three resilient lips 76B which are arranged in a manner diametrically opposed to each of the three arms 58B of the spring. The lips 76B surround the peripheral edge 61B of the curvature 60B (FIG. 7), thereby allowing the insert to be clipped to the spring and the centering and the axial and radial retention of the insert to be ensured relative to axis X-X. In the region of the portions 59B of the arms 58B which are connected to the curvature 60B, the shoulder 74B forms flexible tongues 78B which have an excess thickness and which partially cover these portions of the arms. The three lips 76B and the three tongues 78B alternate at the periphery of the insert.

The lips 76B and the tongues 78B are formed so that the circumferential length of each lip, that is to say, approximately the peripheral distance separating two tongues, is substantially equal to the peripheral distance separating two arms 58B of the spring 56B. In this manner, the lips 76B co-operate with the edges of the arms of the spring in order to ensure securing in terms of rotation of the insert relative to the spring with little play.

In the embodiment described up to this point, the insert is produced from thermoplastic synthetic material, substantially comprising, for example, polyamide, molybdenum and short glass fibres which are intended to reinforce the mechanical characteristics of the insert, in particular in terms of compression.

The double joint 30 further comprises sealing means. These sealing means comprise, on the one hand, a rubber sleeve 80 which has three lobes at the inner surface which is fitted so as to be secured to the double tulip 40. On the other hand, they comprise, for each elementary joint 30A, 30B, a flexible bellows 82A or 82B having a circular cross-section, for example, of thermoplastic material. One end of the bellows 82A or 82B is fixed in a fluid-tight manner to the shaft 12 or 10, whilst the other end is fixed in a fluid-tight manner to the elementary tulip 40A or 40B, respectively, pressing the outer surface having a circular cross-section of the rubber sleeve 80. The bellows are sealed, for example, by means of narrowed rings 84.

The operation of the axle according to the invention is as follows.

At a breaking point of zero, that is to say, when axes X-X and Y-Y of the shafts 10 and 12 are substantially coaxial, the transmission of the torque is carried out from the input shaft 10 to the output shaft 12 in a homokinetic manner, as in driving/steering axles in the prior art.

When the axle 1 is broken in order to allow the steering lock of the wheels 2, the jaw 24 pivots about axis Z-Z under the action of the control member 4 relative to the jaw 22 so that axis Y-Y of the shaft 12 forms a breaking angle β with axis X-X of the shaft 10, as illustrated in FIG. 8.

In so far as the shafts 10 and 12 are axially retained along axes X-X and Y-Y thereof, triangle $0C_AC_B$ is substantially an isosceles triangle having an apex O so that angles $\alpha_A$ and $\alpha_B$ are substantially equal, the sum thereof being equal to breaking angle β, as indicated in FIG. 8, thereby ensuring substantially homokinetic transmission.

In more specific terms, the springs 56A and 56B are pressed by the corresponding ends of the shafts 10 and 12 because the shafts 10 and 12 are axially fixed at the opposite ends 11 and 13 thereof, the shaft 10 being fixedly joined to the planetary gear 9 and the shaft 12 being fixedly joined to the spindle 18 by means of the sleeve 16. By the joint 30A being slid along double-joint axis X'-X', the distance between centre $C_A$ of the joint 30A and plane $P_O$ moves from value $L_A$ of FIG. 2 to value $L\alpha_A$ of FIG. 8, the difference between values $L_A$ and $L\alpha_A$ corresponding to the inner shortening $R_A$ which the elementary joint 30A integrates.

In a concomitant manner and by the forces being distributed substantially symmetrically by means of the springs 56A, 56B and the fixed double tulip 40 along axis X'-X' thereof, the elementary joint 30B slides along axis X'-X' and is shortened by a value $R_B=L_B-L\alpha_B$ which is substantially equal to $R_A$.

In this manner, the transmission of the torque by the axle 1 is substantially homokinetic for any admissible value of breaking angle β. The axle according to the invention thus has improved mechanical characteristics in terms of transmission relative to known axles.

The double joint of the axle according to the invention thus integrates in the operation thereof the shortening R of the axle which results from the steering lock of the wheels and which is inherent in any driving/steering axle, this shortening R being distributed between internal shortenings $R_A$ and $R_B$ of the sliding joints 30A and 30B.

Therefore, it is possible to dispense with the sliding connections at the ends 11, 13 which are opposite those connected by double joints according to the prior art. For example, for the driving/steering type axle 1 of FIG. 1, neither the differential 6 nor the wheel spindle 18 requires arrangements having sliding connections in relation to the shaft 10 and 12 thereof, which allows the input shaft/differential and output shaft/wheel connections to be further strengthened. The noise and wear of the axle according to the invention are thereby reduced and the sealing means simplified.

At an angle, the axle according to the invention allows a substantially greater transmission of the torque, for advantageous radial and diametral dimensions for a substantially homokinetic assembly. The maximum angularity thereof is approximately 55°, for example.

The inserts 68A and 68B which are positioned between the springs 56A, 56B and the corresponding ends of the shafts 10, 12 further improve the operation of the double joint 30. In the absence of these inserts, the surfaces 62A and 62B of the springs 56A and 56B would be directly in contact with the ends of the shafts. The shortening of the steering lock being supported by the deformation of the springs as steering lock angle β increases, the pressure applied to these springs by the shafts 10 and 12 increases and the contact zones between the springs and the shafts tend to decrease. This increase in localised pressure combined, during the operation of the double joint, with the centrifuging of the lubricant contained inside the sleeve 80, brings about a lack of lubrication of the contact zones at the end of the shafts 10 and 12. In the absence of the inserts 68A and 68B, this deficiency in terms of lubrication allows increases in temperature to be brought about which result in damage to the contact surfaces or seizing of the double joint, premature wear of the central portion of the springs or contamination of the lubricant, a reduction in the load value initially imposed on the springs when the double joint is assembled, friction noises, etc.

Conversely, in spite of this local lack of lubrication, the assembly of the inserts 68A and 68B simultaneously ensures:

excellent wear resistance;
a reduction in the wear of the shaft ends;
absorption of noise and vibrations during operation;
good conformity of the surfaces in contact, in particular by superficial wear of the plastics material of the inserts, resulting in an increase in the application surfaces for the pressures, even for large steering lock angles;
a resultant pressure×speed far greater than that obtained by steel/steel contact; and
a reduction in the volume of lubricant necessary, resulting in a reduction in the mass of the double joint 30.

In addition, for a double joint comprising two elementary joints which are individually homokinetic, as in the first embodiment described above with reference to FIGS. 1 to 8, a spacing tolerance in terms of construction and/or installation is acceptable and does not have any kinematic consequences. For example, a relative positioning spacing of the elementary tulips 40A and 40B remains compatible with mechanical characteristics of the axle according to the invention which are acceptable for allowing satisfactory substantially homokinetic transmission, the angular variations of angles $\alpha_A$ and $\alpha_B$ being relatively small. Similarly it should be noted that the shafts 10 and 12 are able to be not strictly co-planar, without thereby significantly limiting the performance of the axle according to the invention.

Figure 9:
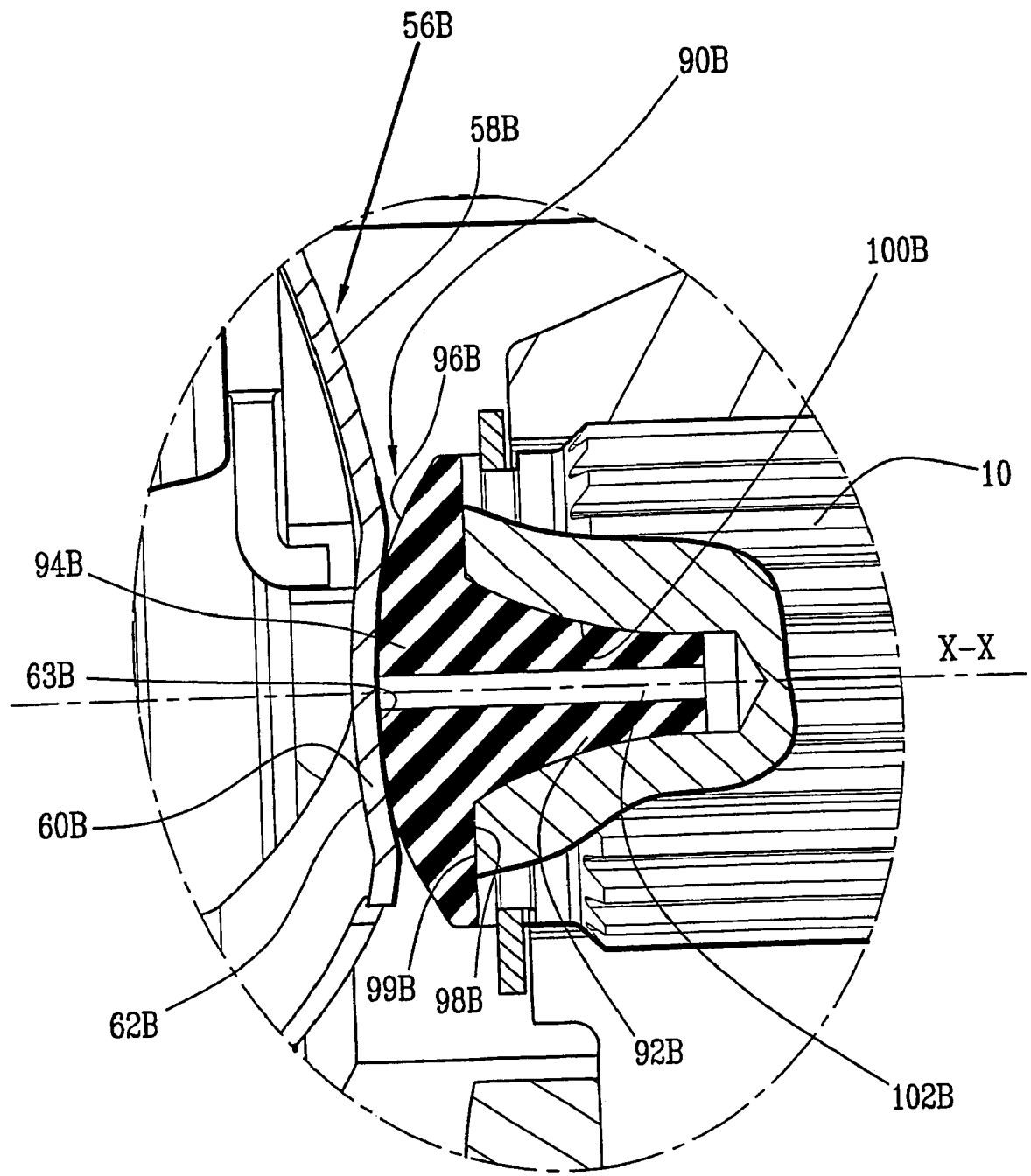
FIG. 9 is a view similar to FIG. 7 of a variant of the insert of plastics material.

FIG. 9 illustrates a variant of the insert of plastics material which is interposed between the spring 56B and the shaft 10. Though described with reference to the elementary joint 30B, such arrangements can be envisaged in a symmetrical manner for the joint 30A.

The variant in FIG. 9 consists in the end of the shaft 10 being provided with an insert 90B of mushroom-like form, comprising an elongate member 92B and a head 94B having a spherical cap. This head has, at the side directed towards the elementary joint 30A, a convex surface 96B which is substantially complementary to the concave surface 63B of the spring 56B. At the side directed towards the shaft 10, the head 94B forms a substantially planar surface 98B which is suitable for resting on a surface portion of the substantially planar end 99B of the shaft 10.

The insert 90B is fixedly joined to the shaft 10 by being force-fitted and secured by the member 92B thereof inside a convergent blind hole 100B which is provided at the end of the shaft 10. A through-hole 102B having an axis substantially aligned with axis X-X when the insert is fixedly joined to the shaft is formed over the insert 90B and allows the escape of residual air present inside the hole 100B when the insert is fitted.

For this variant, the contact zone between the surfaces 63B and 96B, that is to say, the contact zone between the spring 56B and the insert 90B, is optimised in the sense that this contact zone is as large as possible for the entire angular range of breaking of the double joint 30.

FIGS. 10 to 13 illustrate a variant of the star-shaped springs 56A, 56B of the preceding Figures, which are indicated 106A and 106B and which are designed to be mounted with the double joint 30 of the axle 1. Only the spring 106B will be described in detail below, it being understood that the spring 106A has similar arrangements indicated by the same reference numeral followed by the letter A.

In a manner substantially similar to the spring 56B, the spring 106B has ternary symmetry and comprises three arms 108B which extend from a central curvature 110B which carries both a convex face 112B and an opposing concave face 113B which is intended to form a support surface for the end of the shaft 12, which end is connected by the double joint 30. The free end of each arm 108B forms a resilient stop 114B which is suitable for being received in the channel 66 of the double-joint member 40. The spring 106B differs from the spring 56B as follows.

Firstly, the spring 106B comprises three lugs 116B which extend from the periphery of the central curvature 110B at the side of the convex face 112B thereof, substantially in the same direction as that of the arms 108B. The length of these lugs, that is to say, the distance separating the free end thereof from the periphery of the curvature 110B is indicated h. The advantage of these lugs will be explained during the description of the assembly of the axle 1.

Next, each arm 108B is formed by a plurality of consecutive segments 118B which are obtained by the arm being bent. The angles formed between two consecutive segments are selected so that the arms 108B do not come into contact with the rollers 52B of the tripod 32B, even when the double joint functions in the broken state, as in FIG. 12.

The free end of each arm 108B further carries a tongue 120B which is cut off and bent and directed towards the interior of the double joint. Each of these tongues is suitable for being received inside a cavity 122A which is formed in the member 40A of the opposite elementary joint 30A and which opens into the channel 66, as illustrated in FIG. 13. The peripheral dimensions of these tongues and these cavities are substantially equal so as to ensure angular locking of the spring 106B relative to the double-joint member 40.

Finally, the free ends of the folds forming the radial resilient stop 114B carry an end fold 124B, which is illustrated at a large scale in FIG. 13. This fold 124B has a V-shaped profile whose apex is directed towards the outside of the double joint.

The operation of the axle 1 which is provided with the double joint 30 of FIGS. 11 and 12 is substantially similar to that of the double joint of FIGS. 2 and 8. The performance is improved in the sense that the arms 108A, 108B do not impede the movements of the rollers 52A, 52B, even when the double joint 30 is at maximum breaking point. Furthermore, the tongues 120B prevent any circumferential sliding of the springs 106A, 106B brought about by friction generated by orbital movements, commonly referred to as "offset" movements of the ends of the shafts 10 and 12 which are connected by the double joint relative to the surfaces 113A, 113B of the central curvatures 110A, 110B of the springs, and/or by mass and gyroscopic movements of the double-joint member 40 in terms of rotation.

The axle 1 provided with the double joint 30 of FIGS. 11 and 12 is further easier to mount.

On the one hand, the folds of ends 124A, 124B facilitate the introduction of the springs 106A, 106B into the double-joint member 40, the springs being deformed resiliently and radially for this purpose in order to be positioned inside the end portions of the member 40, then, if necessary, pivoted about axis X'-X' in order to position the tongues 120A and 120B angularly so that they are in the axial continuation of the cavities 122A and 122B, and finally displaced axially towards median plane P of the double-joint member with the apices of the folds 124A, 124B being slid over the arches 45A and 45B of the member 40.

Figure 14A:
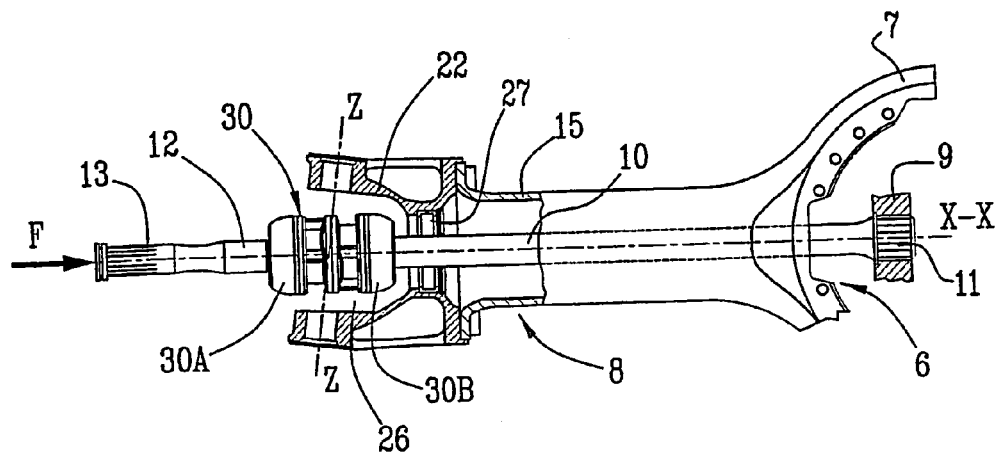
FIGS. 14A, 14B and 14C are partial longitudinal sections of the axle of FIG. 1 which is provided with the double joint of FIGS. 11 and 12, illustrating the assembly of this axle.
Figure 14B:
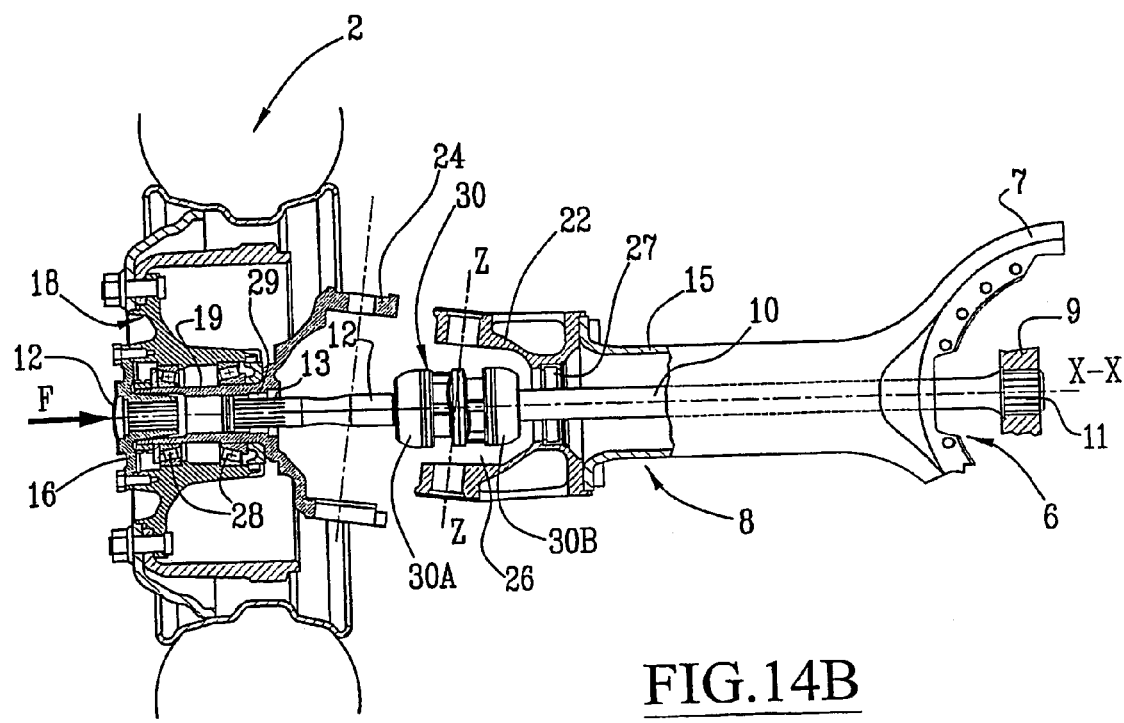
Figure 14C:
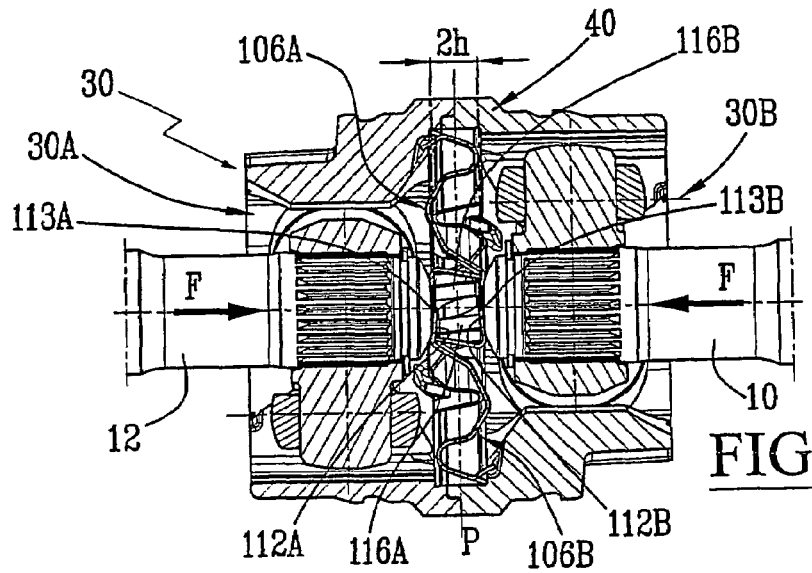

On the other hand, the assembly of one of the transmission lines 8 of the axle 1, illustrated in various successive states in FIGS. 14A to 14C, is as follows. Firstly, an assembly known as the "central" assembly, which is formed by the two shafts 10 and 12 and the double joint 30, is introduced successively inside the jaw 22, the bearing 27, the flared tube 15 and the axle casing 7 until the ribbed end 11 of the shaft 10 is received in the broached hole of the planetary gear 9 of the differential 6. In order to achieve the positioning of this central assembly, an axial force F is applied to the free end 13 of the shaft 12.

Then, an assembly known as the "external" assembly, which is formed by the wheel 2 and the jaw 24 which is fixedly joined to the hub 19, is subsequently presented at the ribbed end 13 of the shaft 12, with this shaft end being introduced inside the bearing 29, as illustrated in FIG. 14B. The external assembly is then displaced until the end ribs of the shaft 12 are engaged in the broached hole of the sleeve 16 which is fixedly joined to the hub 19, with a fitting force F again being applied, for example, having an intensity equal to the force applied for the fitting of the central assembly.

The central and external assemblies are then fixedly joined by positioning the bearing journals 20A and 20B along pivot axis Z-Z and the jaw 24 is connected to the directional control members 4 of the wheels 2.

Finally, the radial positioning and the axial stopping of the sliding elementary joints 30A and 30B of the double joint 30 are ensured by the fixing members 17 being positioned at the ends 11 and 13 of the shafts 10 and 12, as well as, if necessary, by complementary fixing members (not shown) in the region of the bearings 27 and 29.

It will be appreciated that, when fitting forces F are applied, the star-shaped springs 106A and 106B of the double joint are deformed. If the intensity of these forces F is greater than the maximum admissible force during operation for which these springs have been sized, the springs 106A and 106B are deformed to the point of simultaneously bringing these lugs 116A into contact with the convex surface 112B of the spring 106B and the lugs 116B into contact with the convex surface 112A of the spring 106A, as illustrated in FIG. 14C. The axial distance then separating the surfaces 112A and 112B is 2 h.

In this manner, the lugs 116A and 116B form stop members along axis X'-X' of the springs 106A and 106B which are capable of supporting assembly forces of the axle 1 far greater than the maximum admissible load during operation by these springs, without running the risk of deforming the arms 108A and 108B permanently.

Figure 15:
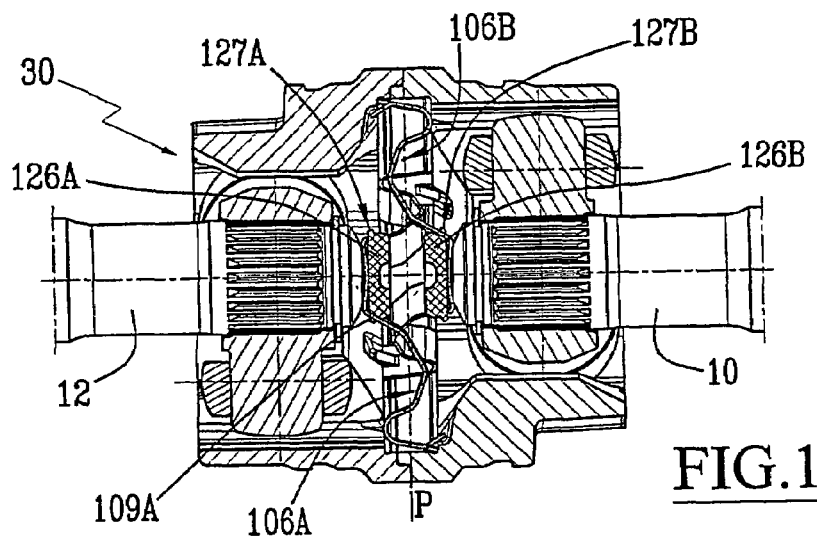
FIGS. 15 and 16 are views similar to FIG. 11, showing variants of the component of FIG. 10.

As a variant, such a stop member is formed, for each spring 106A, 106B, by a rigid stop 126A, 126B which is positioned against the convex face 112A, 112B of the corresponding spring in a symmetrical manner relative to median plane P, as illustrated in FIG. 15. The maximum axial dimension of each stop is equal to approximately h. Each rigid stop is, for example, produced from thermoplastic material and is clipped by fixing members 127A, 127B to the portions 109A, 109B of the arms 108A, 108B which are connected to the central curvature 110A, 110B.

Figure 16:
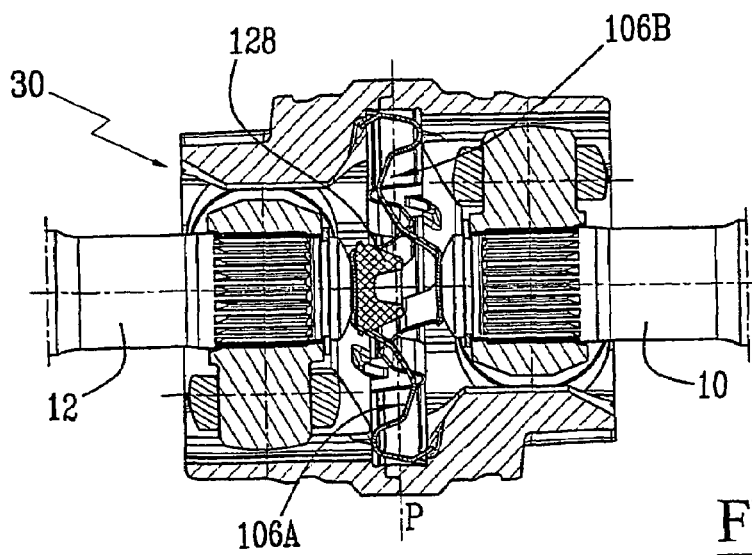

Another variant illustrated in FIG. 16 consists in using only a single rigid stop 128 having a maximum axial dimension equal to approximately 2 h and being fixedly joined to one or other of the springs 106A, 106B.

Figure 17A:
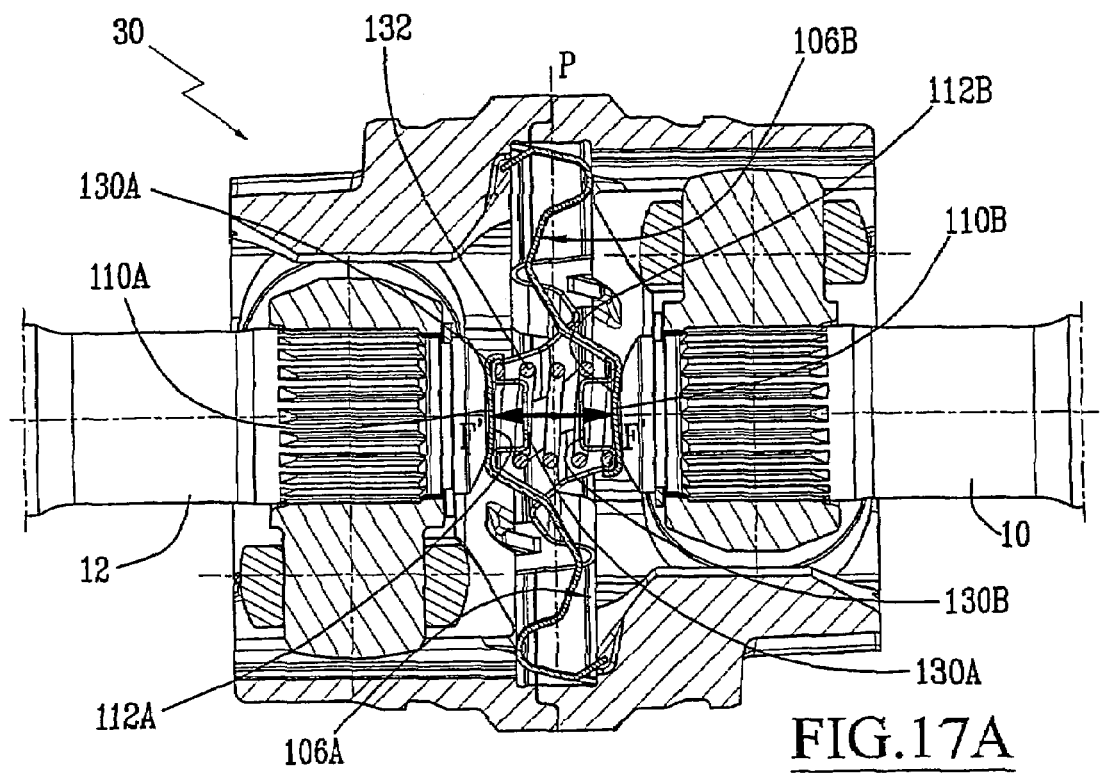
FIGS. 17A and 17B are views similar to FIGS. 2 and 14C, showing a complementary arrangement of the component of FIG. 10.
Figure 17B:
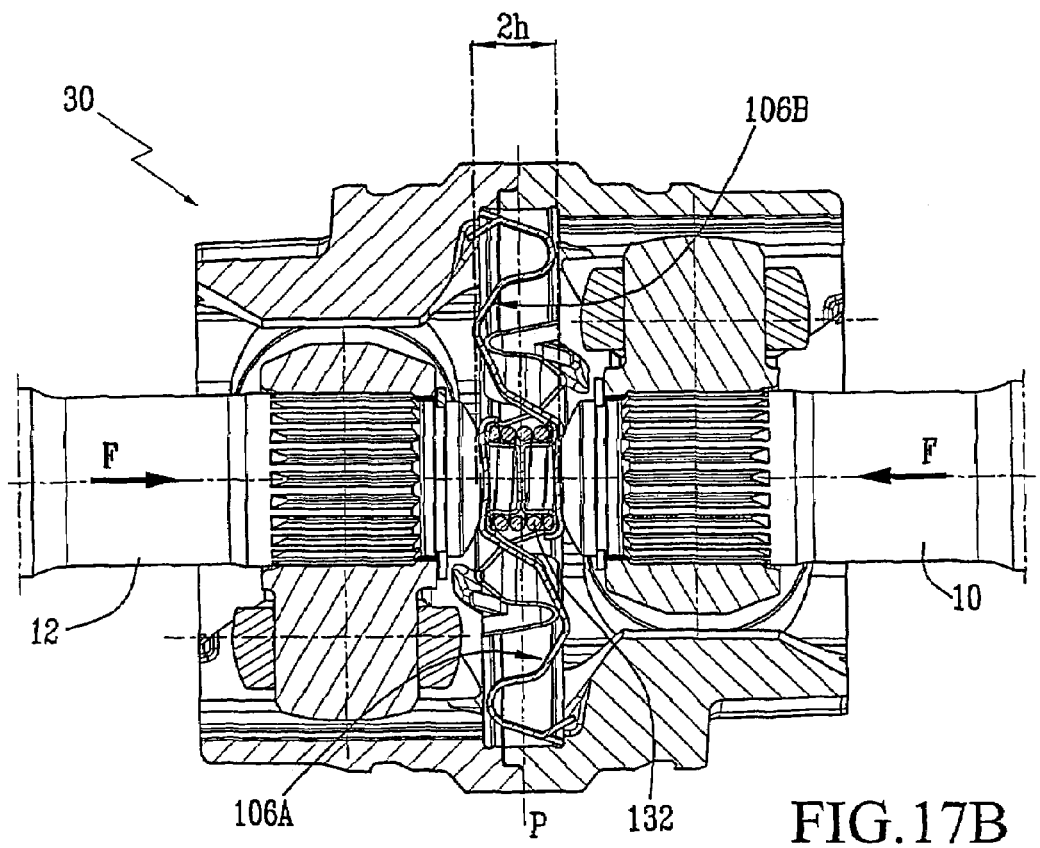

FIGS. 17A and 17B illustrate a variant of the springs 106A and 106B which differ from the springs of FIGS. 10 to 13 only, on the one hand, by the replacement of the stop lugs 116A, 116B with a metal cup 130A, 130B which is fixedly joined, for example, by welding to the convex face 112A, 112B of the central curvatures 110A, 110B of each spring, and, on the other hand, by the presence of a supplementary component, that is to say, a helical compression spring 132 which is arranged in a substantially coaxial manner relative to axis X'-X' between the convex faces of the springs. In an advantageous manner, the maximum outside diameter of the cups 130A, 130B and the inside diameter of the spring 132 are selected so as to radially secure each of the end portions of the springs between one of the cups and the arms 108A, 108B of the corresponding star-shaped spring.

The helical spring 132 is suitable for applying compression forces F' which are parallel with axis X'-X' and which are directed towards the outside of the double joint 30. In this manner, during the assembly of the axle, as explained above, these forces F' are opposed to the fitting forces F. During the operation of the double joint, the helical spring 132 further tends to press the star-shaped springs 106A, 106B on the ends of the shafts 10 and 12 connected by the double joint, thereby increasing the inflexibility of the arms 108A, 108B in terms of flexion. The addition of the compression forces of the star-shaped springs and the helical spring reinforces the axial locking of the shafts 10 and 12 relative to the planetary gear 9 and the sleeve 16, respectively, so that, on the one hand, the positioning of complementary fixing elements designated 17 above, such as screws, nuts or circlips, may become unnecessary, thereby reducing the number of components and the number of assembly steps, and, on the other hand, the natural axial clearances which originate from the bearings 27 and 29, which are responsible for vibration problems, are contained.

Figure 18:
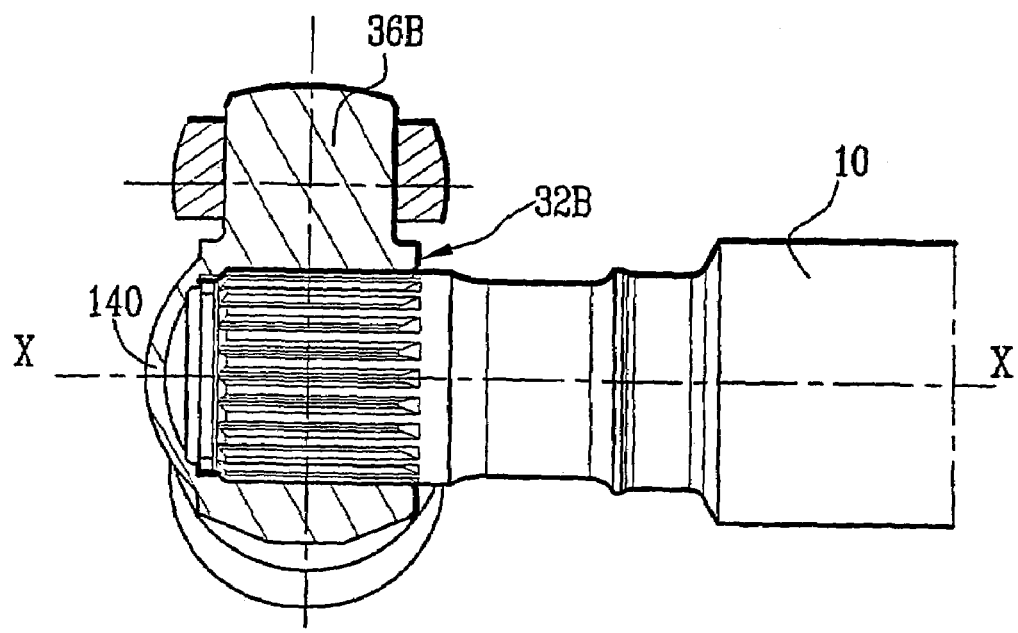
FIGS. 18 and 19 show variants of the shaft end XVIII which is indicated in a frame in FIG. 2.
Figure 19:
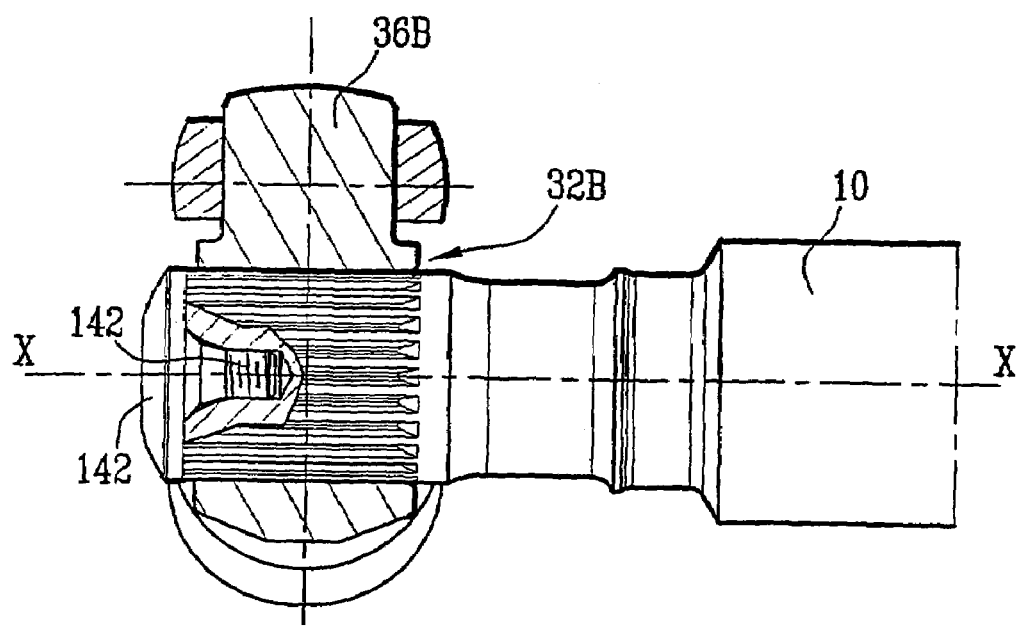

FIGS. 18 and 19 illustrate two variants of the end of the shaft 10 in contact with the spring 56B, respectively. Though described with reference to the elementary joint 30B, such arrangements can be envisaged in a symmetrical manner for the joint 30A.

The variant of FIG. 18 consists in providing the end of the shaft 10 with a tripod 32B and a cap 140 which is substantially spherical and which is located along axis X-X of the shaft 10. The end cap 140 has an outer form which is substantially complementary to that either of the concave surface 63B of the curvature 60B of the spring 56B for a spring which does not have an insert, or the concave surface 72B of the insert 68B for a spring provided with an insert.

The variant of FIG. 19 differs from the embodiment illustrated in FIG. 2 in that the end of the shaft 10 is provided integrally with a pin 141 which is located along axis X-X and which is provided with a head having a spherical cap 142. This end cap 142 itself also has an outer form which is substantially complementary to that of the curvature 60B of the spring 56B or the insert 68B.

For these two variants of FIGS. 18 and 19, the contact zone arranged between the support spring 56B or the insert 68B thereof and the end cap 140 or 142 is optimised in the sense that this contact surface is as large as possible for the entire angular breaking range of the double joint.

Figure 20A:
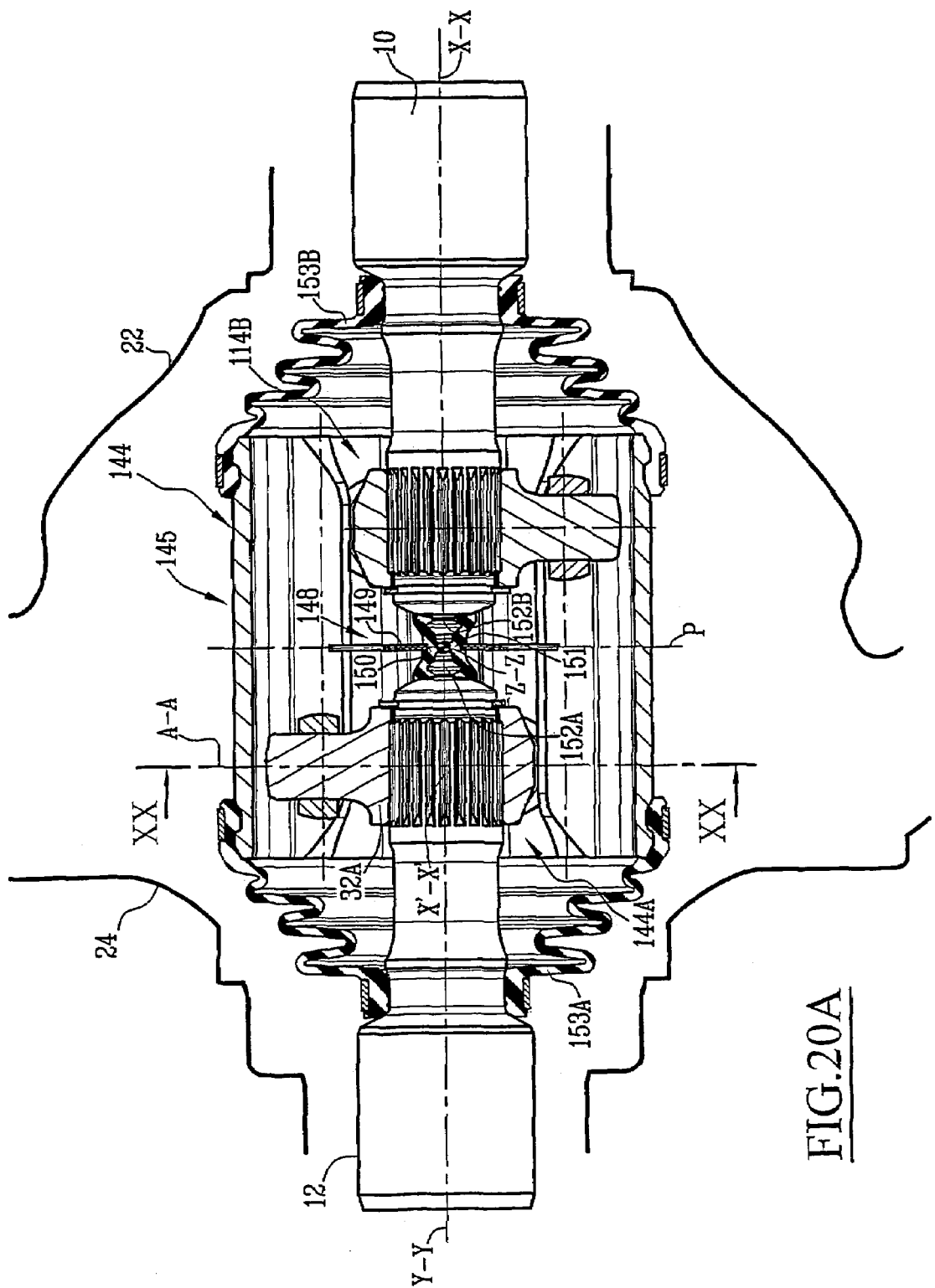
FIGS. 20A and 20B show a variant of the double joint of FIG. 2, FIG. 20A being a view substantially similar to FIG. 2 and FIG. 20B being a view sectioned along plane XX—XX indicated in FIG. 20A.
Figure 20B:
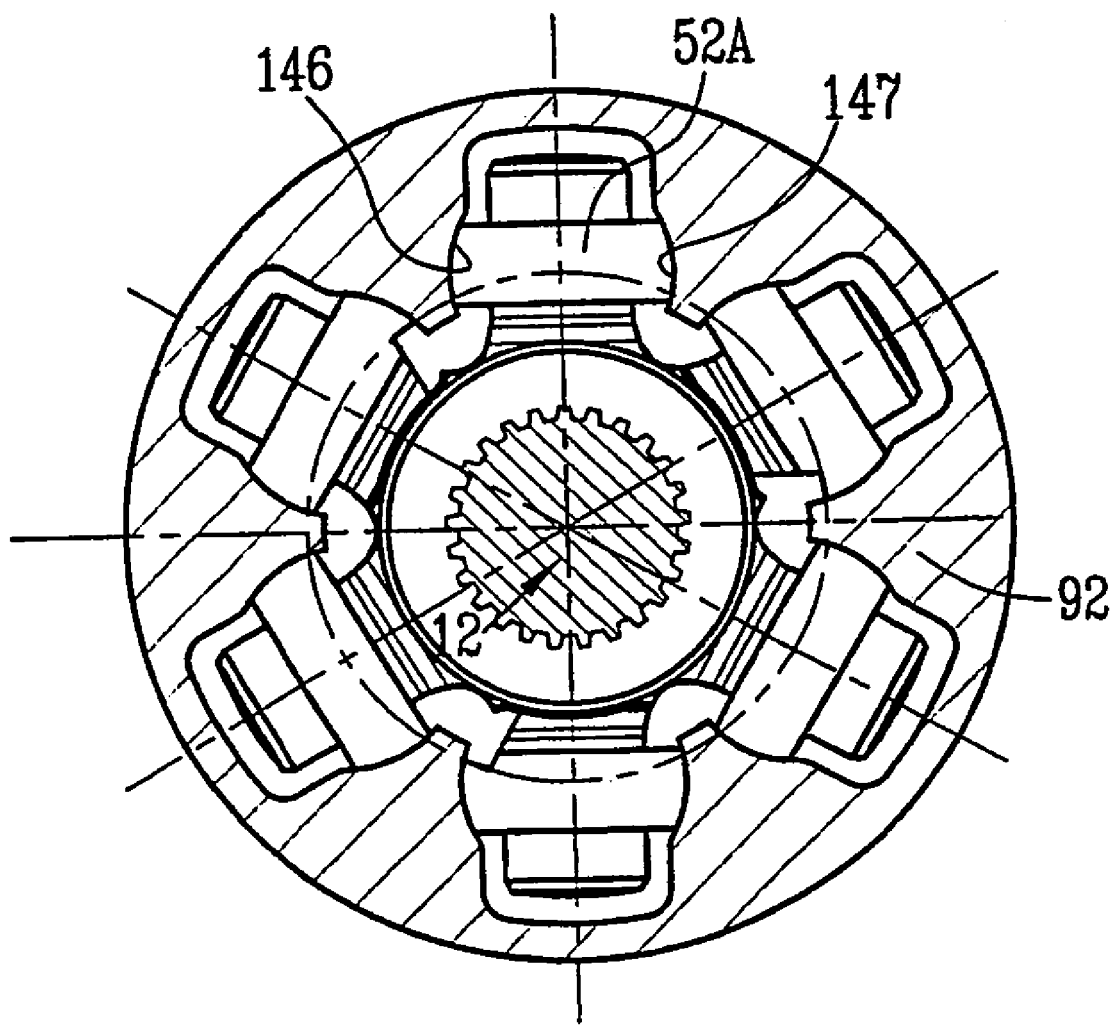

FIGS. 20A and 20B illustrate a first variant of a double joint 144 of the axle according to the invention. This double joint 144 differs from the double joint 30 of the FIGS. 2 to 8 only as follows, the common elements thereof relative to the double joint 30 carrying the same reference numerals.

The double joint 144 comprises two elementary joints 144A and 144B, which are both individually homokinetic, of the tripod type and sliding. Only the components of the joint 144A which are different from those of the joint 30A will be described in greater detail below, the components of the joint 144B being apparent by substitution of the letter A for the letter B.

The double joint 144 comprises a double-joint member or double-tulip member 145 having an axis X'-X', which is formed by two elementary tulips of the elementary joints 144A and 144B, which elementary tulips are juxtapositioned at one side and the other of joint plane P. In more specific terms, the double tulip 145 has 6-fold symmetry relative to axis X'-X': it has a substantially circular outer periphery and delimits internally six pairs of tracks 146, 147 which face each other, one pair of tracks from each two being associated with the three arms 36A of the tripod 32A of the joint 144A, and the remaining pairs of tracks being associated with the three arms 36B of the tripod 32B of the joint 144B, respectively.

The double-joint member 145 comprises an axial maintenance mechanism 148 along the axis X'-X' thereof for the elementary joints 144A and 144B. This mechanism 148 comprises, on the one hand, a rigid plate 149 which extends along plane P and which is fixed internally to the double tulip 145. This plate 149 comprises a hole 150 which is substantially coaxial with the axis X'-X' of the double joint.

On the other hand, the mechanism 148 comprises a rubber stop 151 which has a generally cylindrical form and which extends inside the hole 150 along axis X'-X'. The outside diameter of this stop 151 is greater than the diameter of the hole 150 so that material swellings of the stop extend over a portion of the walls of the plate 149 in the region of the hole 150 thereof. In this manner, the stop 151 is integrally fixed to the plate 149. The end portions of the stop 151 are in contact with the respective ends of the shafts 10 and 12 along concave contact surfaces 152A, 152B, respectively, which have a function similar either to the surfaces 63A, 63B for the double joint 30, which does not have an insert, or the surfaces 72A, 72B for the double joint 30 which is provided with the inserts 68A and 68B.

The double joint 144 further comprises sealing means which comprise, for each elementary joint 144A, 144B, a convergent bellows having circular folds 153A, 153B, respectively. One end of each bellows is fixed to the corresponding shaft 10 or 12, whilst the other end is fixed in a fluid-tight manner to the outer surface having a circular cross-section of the double tulip 145.

The operation of the axle with the double joint 144 is substantially similar to that of the axle with the double joint 30.

Figure 21:
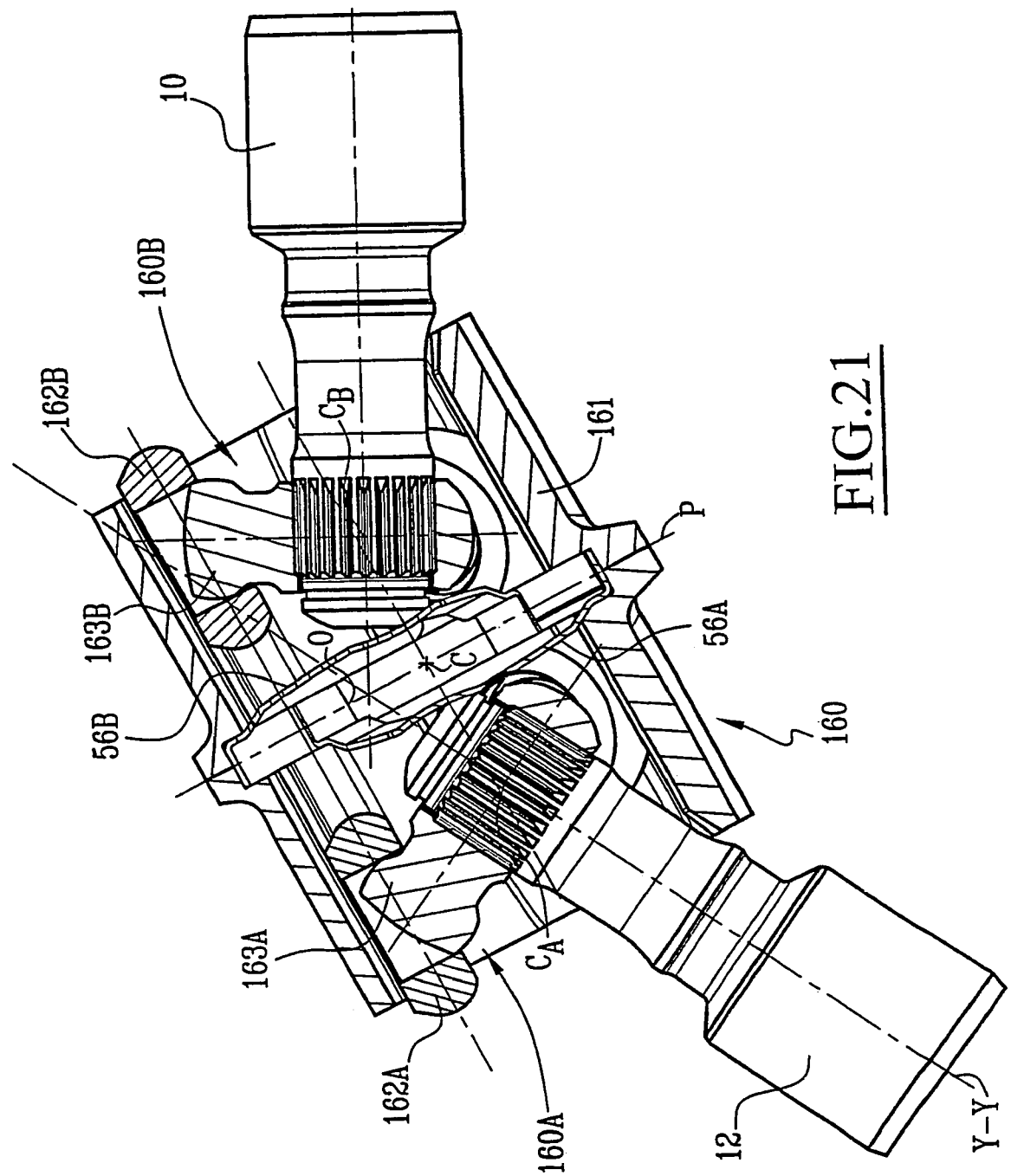
FIG. 21 is a view substantially similar to FIG. 8 and shows another variant of a double joint of the axle according to the invention.

FIG. 21 illustrates a second variant of a double joint 160 having two elementary joints 160A, 160B of the axle according to the invention, which differs from the double joint 30 of FIG. 2 only as follows.

Unlike the embodiment described with reference to FIG. 2, the two elementary tulips 161A, 161B which form a double tulip 161 having an axis X'-X' are positioned with zero displacement, that is to say that each pair of tracks of the elementary tulip 161A is positioned substantially in the continuation of a pair of tracks of the elementary tulip 161B.

The mechanical transmission means 50A, 50B of each arm 36A, 36B further comprise outer rollers 162A, 162B, respectively, which have a toric outer form in order to roll on the corresponding pair of tracks of the double tulip 161, which rollers are mounted so as to swivel on the free end of each arm which forms a substantially spherical bearing journal 163A, 163B, respectively.

Finally the springs 56A, 56B, although they fulfil the same functions as those of the embodiment of FIG. 2, are of slightly different forms in order to take into consideration the inner geometry of the double tulip 161.

The operation of this double joint 160 is substantially similar to that of the double joint 30 of FIG. 2.

This homokinetic variant has the effect of eliminating any variations of the straight line which connects the centres $C_A$, $C_B$ of the elementary joints about centre C of the double joint, which results from the phenomenon generally referred to by the general term of offset movement when a tripod type joint functions at an angle. Conversely, for the double joint 160, this straight line, $C_A C_B$ remains parallel with axis X'-X' of the double tulip 161, optionally generating a negligible unbalance.

Figure 22A:
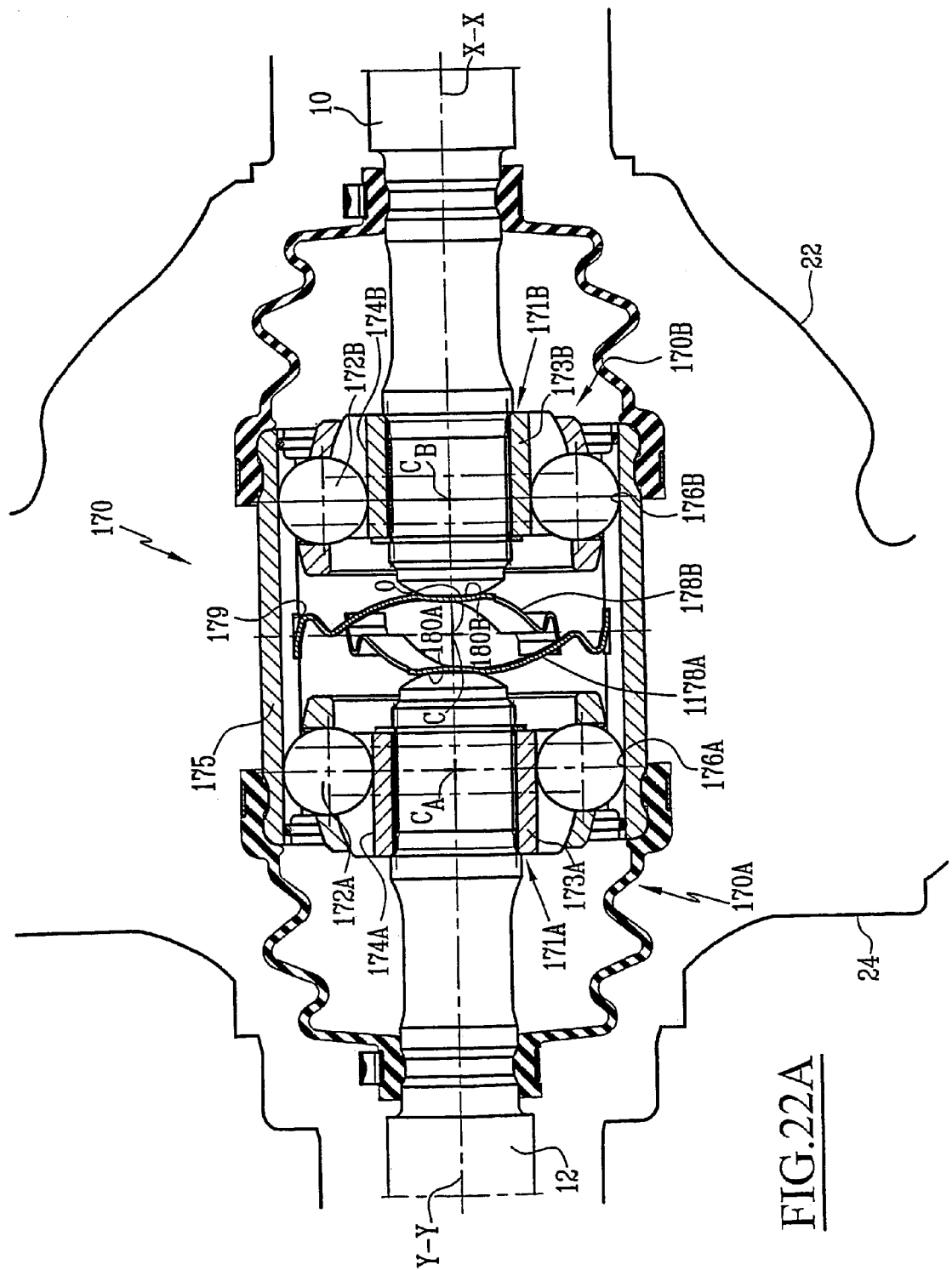
FIGS. 22A and 22B show another variant of a double joint of the axle according to the invention, FIG. 22A being a view substantially similar to FIG. 2 and FIG. 22B being a view substantially similar to FIG. 8.
Figure 22B:
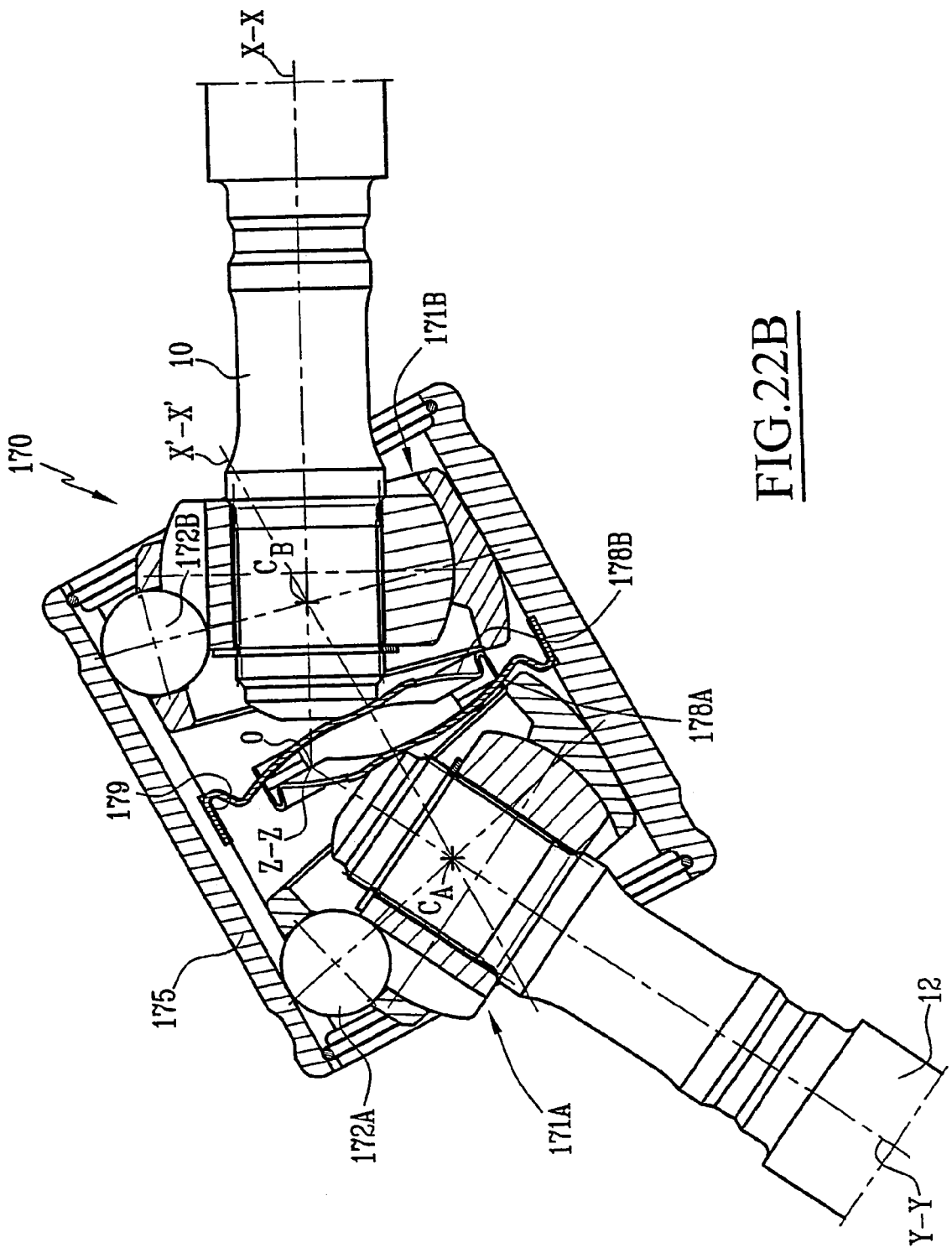

FIGS. 22A and 22B illustrate a third variant of a double joint 170 of the axle according to the invention, connecting the input shaft 10 and output shaft 12.

This double joint 170 comprises two elementary ball type joints 170A and 170B which are individually sliding and homokinetic. Each ball type joint comprises, at the ends of the shafts 12 and 10, a male portion 171A, 171B of known structure and six driving balls 172A, 172B. The male portion 171A comprises an externally spherical inner nut 173A having six grooves 174A.

The double joint 170 comprises a double-joint member 175 which forms the female portion of the male portions of the elementary joints 170A and 170B. To this end, the double-joint member has internally six pairs of running tracks 176A, 176B for the balls 172A, 172B parallel with the axis of the member 175. The running tracks 176A of an elementary joint are in the continuation of the running tracks 176B of the other elementary joint.

The double joint 170 further comprises star-shaped springs 178A, 178B for adjusting the sliding actions of the elementary joints 170A, 170B. These springs have a function and structure substantially similar to those of the springs 56A, 56B of the double joint 30 of FIGS. 2 to 8. In particular, they are in contact with the double-joint member 175 by means of a circular channel 179 arranged at the inner periphery of the double-joint member, and each comprise a contact zone 180A, 180B for the ends of the shafts 12 and 10 which are connected by the double-joint 170.

The operation of the axle provided with this double joint 170 is substantially similar to that of the axle of FIG. 2.

Another variant (not illustrated) of the double joint of the axle according to the invention comprises a double joint having two elementary joints with axial engagement. Each elementary joint allows a torque transmission movement by two facing engagements which comprise axial teeth which mesh with each other.

FIGS. 23, 24, 25A and 25B illustrate a second embodiment of a double joint of an axle according to the invention.

Unlike the first embodiment described above, wherein the double joint of the axle according to the invention was constituted by two freely sliding elementary joints which are both capable of absorbing the shortening action R of the steering lock of the axle 1, this second embodiment consists in forming a double joint with a single freely sliding elementary joint which can absorb all of the shortening action R.

FIGS. 23 and 24 illustrate a homokinetic double joint 200 which connects the shafts 10 and 12 of FIG. 1. This double joint 200 defines an articulation centre O at the intersection of the axes of the input shaft 10 and output shaft 12 when they form a breaking angle β as in FIGS. 13A and 13B. As in the other variants, the double joint 200 is positioned, when it is being assembled, in order to form an articulation according to the invention, for example, inside the cavity 26 defined in FIG. 1, so that pivot axis Z-Z of the articulation extends substantially through centre O of the double joint 200 for any value of breaking angle β.

The double joint 200 comprises a first elementary joint 200A in the form of a cardan joint having co-planar cross-pieces, which is known per se. This cardan joint 200A substantially comprises a cross-piece 202A comprising a first arm 204A having axis A-A contained in the plane of FIG. 23 and perpendicular to axis Y-Y, and a second arm 206A having axis A'-A' which is substantially perpendicular to axes Y-Y and A-A. The intersection of axes A-A and A'-A' defines breaking center $C_A$ of the joint 200A. The first arm 204A is arranged so as to be able to rotate relative to axis Y-Y on a flanged fork 208A which is fixedly joined to the shaft 12. The second arm 206A is also arranged so as to be able to rotate relative to axis Y-Y on a flanged fork 210A.

The double joint 200 comprises a second elementary joint 200B in the form of a sliding bipodal joint, which is also known per se. This bipodal joint has a cardan type kinematic arrangement which is advantageously similar to that of the joint 200A. The joint 200B has binary symmetry relative to axis X-X. It comprises a male or bipodal element 202B which comprises a ribbed hole 203B and two radial arms 204B which extend opposite each other and which have a common axis B-B. The intersection of the axes X-X and B-B delimits breaking center $C_B$ of the joint 200B. The ribbed hole 202B is suitable for being fitted so as to be secured to the ribbed end 11 of the shaft 10.

The bipodal joint 200B also comprises a female element 206B having binary symmetry relative to central axis X'-X', this axis being aligned with axis X-X in the aligned position of the joint of FIG. 23. At one side and the other of each arm 204B, this tulip has two cylindrical tracks 208B and 210B facing each other and a spherical roller 212B having an axis of rotation substantially aligned with axis B-B is mounted so as to slide on each arm 204B and is intended to roll on one or other of the corresponding tracks 208B and 210B.

According to the invention, the fork 210A of the arm 206A of the joint 200A is fixedly joined to the tulip 206B of the joint 200B so that these two components form a double-joint member 202 all in one piece having axis X'-X'. The fork 210A and the tulip 206B are arranged relative to each other so that axis A-A of the joint 200A and axis B-B of the joint 200B are substantially parallel. The double-joint member 202 thus defines a center C at the intersection of axis X'-X' and plane P, this plane being defined as the plane half-way between axes A-A and B-B. In the aligned position, the distance separating breaking centers $C_A$ and $C_B$ is indicated L (see FIG. 23).

The double joint 200 also comprises sealing means having a function similar to those described for the double joint 30 of FIG. 2. These sealing means are simplified for the elementary cardan joint 200A, which functions without an oil retention bellows. For the bipodal joint 200B, a folded bellows 216 which is fixed in a fluid-tight manner to the shaft 10 on the double-joint member 202 is provided, which member 202 can be, though not illustrated in the Figures, provided with an outer sleeve which extends over the entire periphery thereof.

The operation of the double joint 200 is substantially similar to that of the double joint 30 of FIG. 2, with the difference that one of the two elementary joints is fixed, that is to say, joint 200A. The distance separating articulation center O from center $C_A$ of the joint 200A is therefore constant owing to the very nature of the joint.

For the sliding joint 200B, the distance separating center $C_B$ thereof from articulation center O also remains constant, by means of the double-joint member 202, axially fixed along axis X'-X' thereof, because this double-joint member 202 is formed in part by the fork 210A of the fixed joint 200A.

Figure 25A:
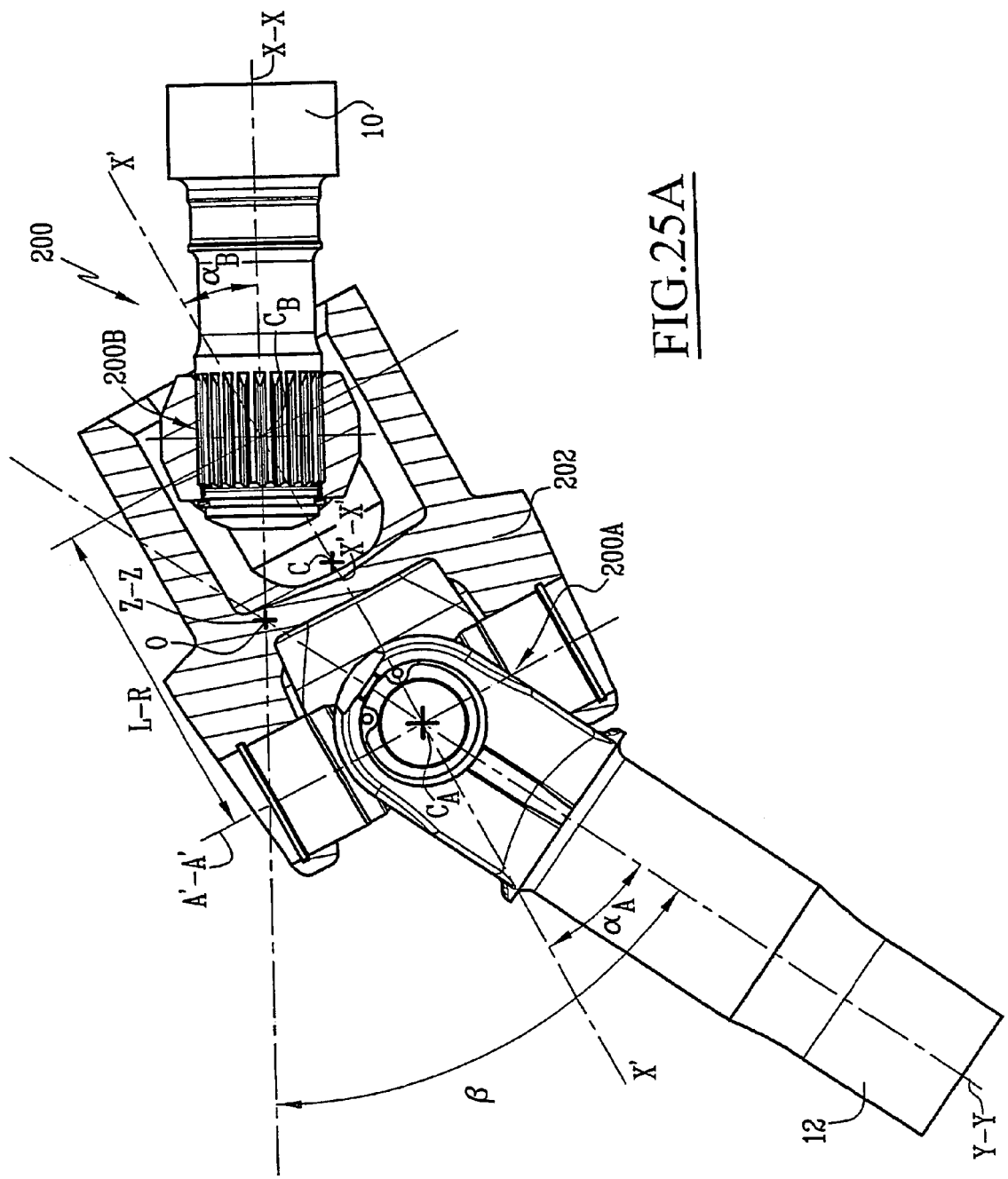
FIGS. 25A and 25B are views similar to FIG. 23, each illustrating an operating state of the axle according to the invention.
Figure 25B:
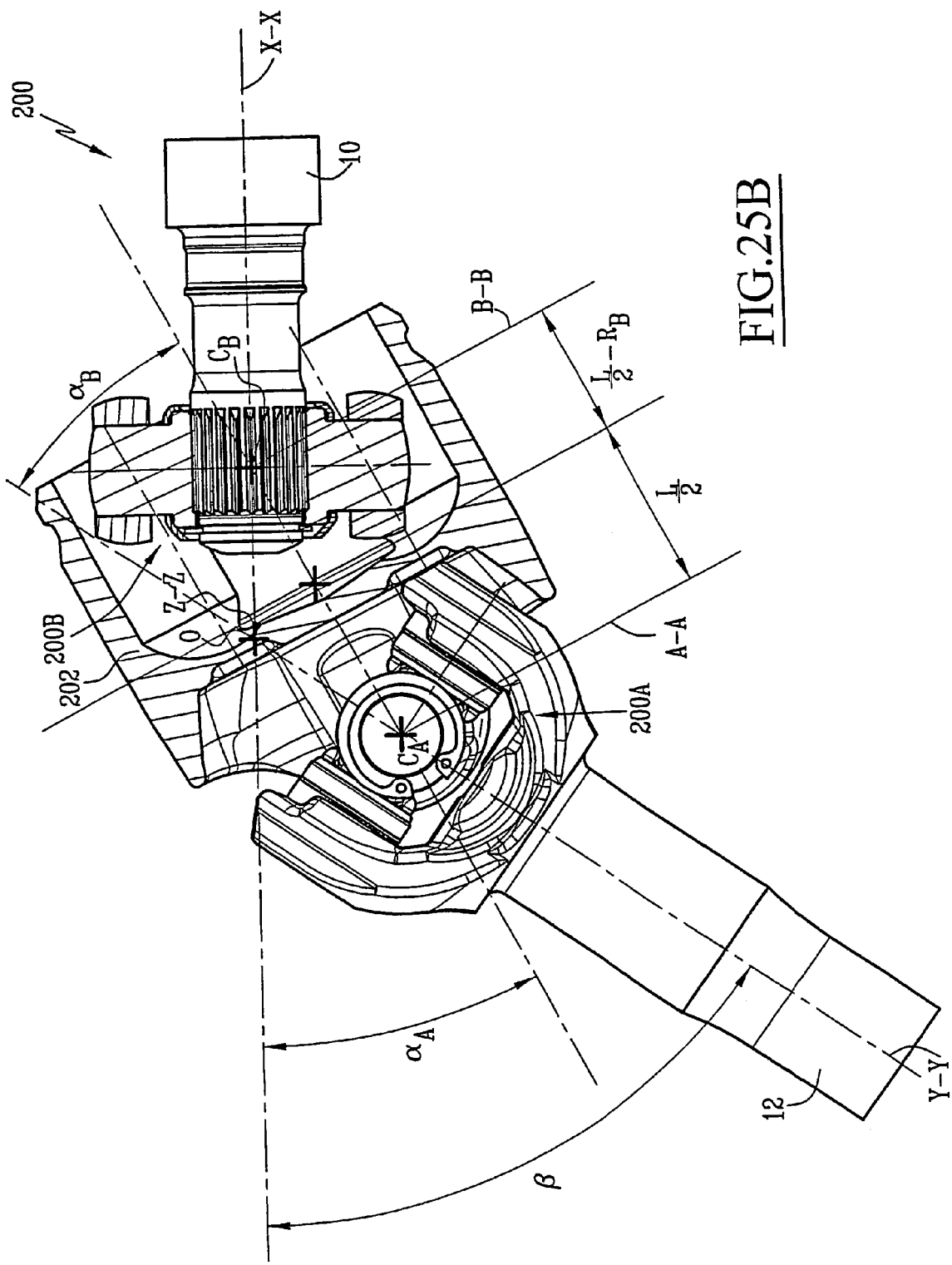

Consequently, angles $\alpha_A$ and $\alpha_B$ are substantially equal, as illustrated in FIGS. 25A and 25B. The axle according to the invention allows substantially homokinetic torque transmission for any admissible value of angle β and the mechanical characteristics thereof in terms of transmission are improved.

When the axle 1 is broken by the steering lock of the drive wheels 2, the double joint further integrates the shortening of distance $C_A C_B$ owing to the steering lock only by the integrated shortening $R_B$ of the sliding joint 200B.

Figure 26:
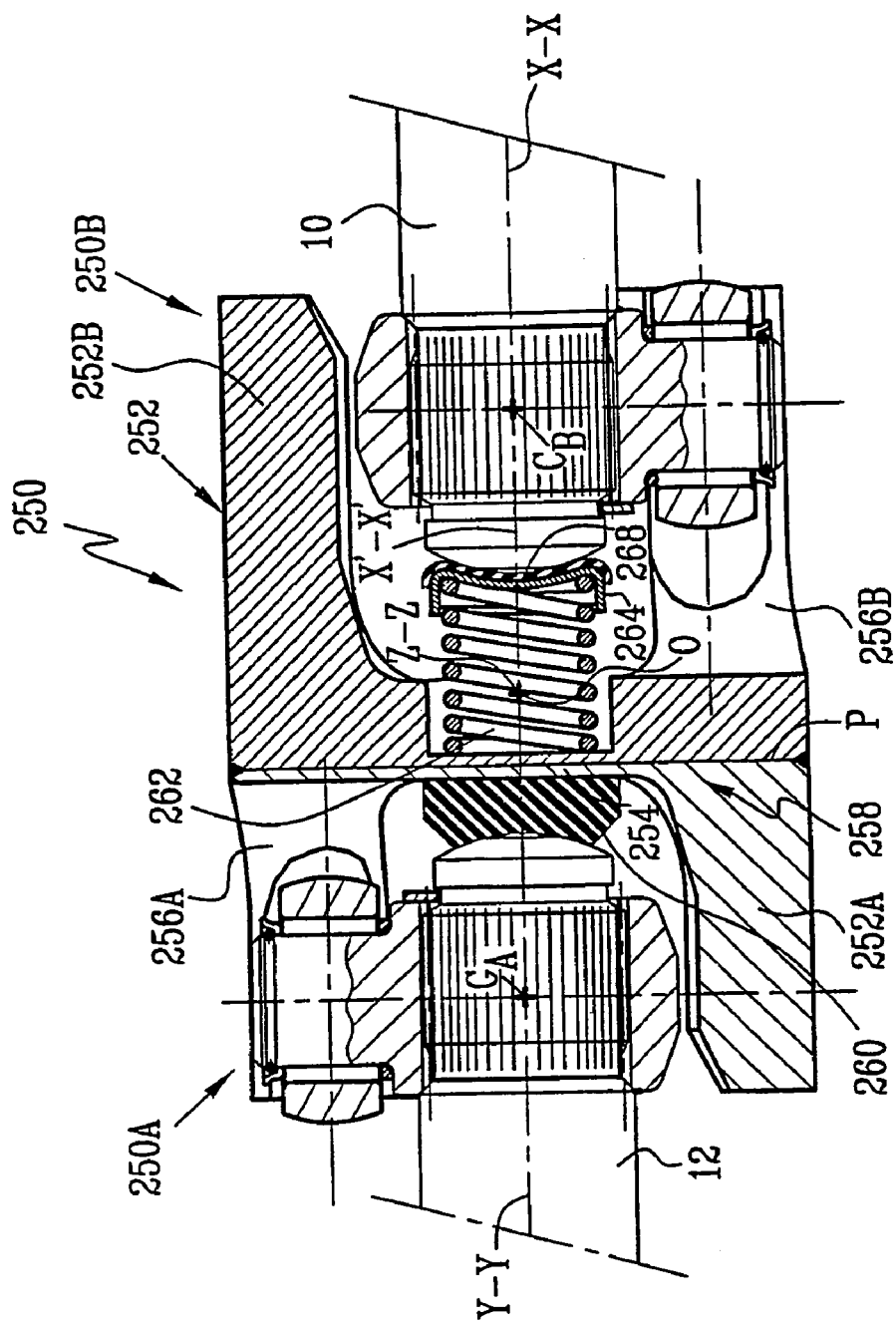
FIG. 26 is a view similar to FIG. 23, but of a variant of the second embodiment of FIG. 23.

FIG. 26 illustrates a double joint 250 as a variant of the second embodiment which is described above. The double joint 250 comprises a first tripod type elementary joint 250A, which does not slide during operation, and a second tripod type elementary joint 250B which slides freely. The double joint 250 comprises a double-joint member 252 which delimits a double-joint axis X'-X' and which comprises the two elementary joint members 252A and 252B of the joints 250A and 250B which are fixedly joined to each other, for example, by welding.

Unlike the embodiment of FIG. 2, the double-joint member 252 does not delimit an inner cavity which is common to the two elementary joints, but instead forms a wall portion 254 which extends transversely to double-joint axis X'-X' in the region of a junction plane P and which thereby delimits two separate cavities 256A, 256B for swivelling of the joints 250A and 250B. Each cavity is open outwards both at the side of the joint member directed towards the associated shaft and laterally.

The double joint 250 also comprises, on the one hand, an integral insert 260, for example, of thermoplastic material, which is fixedly joined to the double-joint member 252 which is positioned between the wall portion 254 and the end of the shaft 12 and, on the other hand, a compression spring 262 which is positioned between the wall portion 254 and the end of the shaft 10. This spring 262 is provided at the end thereof directed towards the shaft 10 with a metal cap 264.

An insert 268 of plastics material is positioned between the metal cap 264 and the end of the shaft 10. The insert 268 is fixedly joined to the metal cap 264, for example, by clipping by means of resilient lips which are substantially similar to the lips 76B for the insert 68B.

The operation of the double joint 250 is substantially similar to that of the double joint 200 of FIG. 23, the joint 250A behaving like a fixed joint owing to the rigidity of the insert 260 which is stopped against the wall portion 254 and which thereby retains the sliding portion of the joint, although this joint 250A can slide in structural terms per se. The distance separating articulation center O from center $C_A$ of the joint 250A is therefore constant. For the sliding joint 250B, the distance separating center $C_B$ thereof from articulation center O also remains constant by means of the double-joint member 252 which is axially maintained along axis X'-X'thereof by the spring 262 and by the wall portion 254. When the axle 1 is broken by the steering lock of the drive wheels 2, the double joint 250 integrates the shortening of the distance $C_A C_B$ owing to the steering lock only by means of the joint 250B.

As in the first embodiment, positioning inserts of plastics material in pressed contact between the ends of the shafts and the axial maintenance means of the double-joint member improves the mechanical characteristics and the longevity of the joint, even in the case of a lack or local absence of lubrication.

This variant of the second embodiment further allows the blind holes 10A, 100B of the shafts, which are generally machined during the production of the shafts, to be used to receive integrally the inserts 260 and 268, as in the variant of FIG. 9.

Various variants in relation to the axle described above can be envisaged, consisting both in providing elementary joints of a different structural and/or kinematic type and in carrying out arrangements in terms of the axial maintenance mechanism of the sliding portion of the double joint. By way of example, with regard to the inserts arranged between the axial maintenance mechanism and the double-joint member, materials other than thermoplastic materials can be used given that these materials are sufficiently strong whilst allowing a reduction in wear and friction forces, such as copper alloys; furthermore, the zones of contact between the star-shaped springs and the inserts can be subject to anti-friction adhesive coating by means of materials of the polyamide or teflon type.

The invention claimed is:

1. A beam driving/steering axle for motor vehicles, comprising a differential and two transmission lines which originate from the differential and which are each adapted for driving a drive and steering wheel, each transmission line comprising:

an input shaft which is connected to the differential, an output shaft which is connected to the corresponding drive wheel, a wheel pivot having an axis which is orientated transversely to each of the input shaft and the output shaft, a double joint for torque transmission between the input shaft and the output shaft, the input and output shafts being guided directionally in space independently of the double joint, the double joint being arranged substantially perpendicularly to the pivot and comprising two elementary joints which are connected axially to each other along a double joint axis and which each have an elementary breaking center, at least one of the two elementary joints being a joint which slides freely along the double joint axis, and axially retaining mechanisms for the input shaft and output shaft along the respective axis thereof, such that each of the input and output shafts define a fixed position along their respective axis for the elementary breaking center of the corresponding elementary joint.

2. An axle according to claim 1, wherein the input shaft is fixedly joined to a planetary gear of the differential, ensuring the axial retention of the input shaft along the axis thereof, and wherein the output shaft is fixedly joined to a wheel spindle of the corresponding drive wheel, ensuring the axial retention of the output shaft along the axis thereof.

3. An axle according to claim 1, wherein the two elementary joints are axially connected by a double-joint member.

4. An axle according to claim 1, wherein the first elementary joint is a freely sliding joint, and the second elementary joint is a non-sliding joint.

5. An axle according to claim 3, wherein the double joint comprises an axial maintaining mechanism for the double-joint member for adjusting the sliding action of each freely sliding elementary joint, the axial maintenance mechanism connected to the double-joint member and in direct or indirect contact with the input shaft and output shaft.

6. An axle according to claim 3, wherein the axial maintenance mechanism comprises at least one axially resilient stop member which is retained relative to the double-joint member and which has a zone of direct or indirect contact for the ends of the shafts which are connected by the double joint.

7. An axle according to claim 6, wherein the zone of direct contact and the corresponding shaft end have substantially complementary forms.

8. An axle according to claim 5, wherein the double joint comprises at least one insert which is positioned between the axial maintenance mechanism and at least one of the input shaft and the output shaft.

9. An axle according to claim 8, wherein each insert has a convex surface for contact with an associated surface of the axial maintenance mechanism which is substantially complementary to the convex surface.

10. An axle according to claim 8, wherein each insert has a concave surface or planar surface for contact with an end surface of the corresponding shaft having a form which is substantially complementary to the concave or planar surface.

11. An axle according to claim 8, wherein each insert is fixedly joined to the axial maintenance mechanism.

12. An axle according to claim 8, wherein each insert is fixedly joined to the corresponding shaft.

13. An axle according to claim 8, wherein each insert is made of a plastic containing polyamide, molybdenum and glass fibers.

14. An axle according to claim 5, wherein the first elementary joint is a freely sliding joint, and the second elementary joint is a sliding joint with an axial retention mechanism for the sliding portion.

15. An axle according to claim 5, wherein the two elementary joints are freely sliding, and wherein the axial maintenance mechanism comprises, for each elementary joint, an axially resilient stop member which is formed by a star-shaped spring having a curvature which forms a direct or indirect contact for the ends of the shafts, which ends are connected by the double joint, and a plurality of arms which extend radially relative to the double-joint axis from the curvature and whose free ends are received in a channel which is formed in an internal periphery of the double-joint member.

16. An axle according to claim 15, wherein at least one arm of each star-shaped spring comprises means for angularly indexing the star-shaped spring relative to the double-joint member.

17. An axle according to claim 15, wherein the axial maintenance mechanism comprises an axial stop member which is arranged between the curvatures of the two star-shaped springs and which is adapted to provide a minimum spacing between these curvatures at least during the assembly of the axle.

18. An axle according to claim 15, comprising a compression spring interposed between the curvatures of the two star-shaped springs and which is adapted to fix the axial position of each of the input shaft and the output shaft along the axes thereof.

19. An axle according to claim 1, wherein the two elementary joints are substantially homokinetic.

20. An axle according to claim 19, wherein the two elementary joints are selected from tripod joints, ball joints and axial engagement joints.

21. An axle according to claim 1, wherein the two elementary joints have a substantially similar cardan kinematic arrangement.

22. An axle according to claim 1, wherein the input shaft and output shaft are substantially co-planar and define an articulation center at the point of intersection of the axes thereof when the axes form a breaking angle ($\beta$) of the double joint.

23. An axle according to claim 22, wherein, for any permissible value of the breaking angle ($\beta$) of the double joint, the elementary breaking angles ($\alpha_A$, $\alpha_B$) of each elementary joint are substantially equal.

24. An axle according to claim 1, wherein each elementary joint is a tripod joint having a joint member comprising three pairs of sliding tracks, wherein the three pairs of tracks of one elementary joint are displaced through approximately 60° relative to the three pairs of tracks of the other elementary joint.

25. An axle according to claim 1, wherein each elementary joint is a tripod joint having a joint member comprising three pairs of sliding tracks, wherein the three pairs of tracks of one elementary joint are arranged substantially as a continuation of the three pairs of tracks of the other elementary joint.

* * * * *